(12) United States Patent
Csik et al.

(10) Patent No.: US 8,277,158 B2
(45) Date of Patent: Oct. 2, 2012

(54) FLOATING NUT PLATE

(75) Inventors: Terrence Csik, Pasadena, CA (US); Igor Komsitsky, Los Angeles, CA (US)

(73) Assignee: The Monadnock Company, Torrance, CA (US)

( * ) Notice: Subject to any disclaimer, the term of this patent is extended or adjusted under 35 U.S.C. 154(b) by 0 days.

(21) Appl. No.: 11/940,330

(22) Filed: Nov. 15, 2007

(65) Prior Publication Data

US 2009/0129885 A1    May 21, 2009

(51) Int. Cl.
*F16B 39/284* (2006.01)

(52) U.S. Cl. .......................... 411/111; 411/85

(58) Field of Classification Search ............... 411/111, 411/112, 85, 432; 248/49
See application file for complete search history.

(56) References Cited

U.S. PATENT DOCUMENTS

| | | | |
|---|---|---|---|
| 910,712 A | 1/1909 | McCoy | |
| 2,144,350 A | 1/1939 | Swanstrom | |
| 2,144,553 A * | 1/1939 | Simmonds | 411/111 |
| 2,159,573 A | 5/1939 | Tinnerman | |
| 2,344,102 A | 3/1944 | Meisterhans | |
| 2,381,233 A | 8/1945 | Mills | |
| 2,409,209 A | 10/1946 | Johnson | |
| 2,421,278 A | 5/1947 | Luce | |
| 2,469,311 A | 5/1949 | Poupitch | |
| 2,477,429 A | 7/1949 | Swanstrom et al. | |
| 2,552,499 A | 5/1951 | Tinnerman | |
| 2,633,886 A | 4/1953 | Tinnerman | |
| 2,705,991 A | 4/1955 | Reiner | |
| 2,875,805 A | 3/1959 | Flora | |
| 2,968,329 A | 1/1961 | Reiner | |
| 2,991,816 A | 7/1961 | Harbison et al. | |
| 3,009,499 A | 11/1961 | Weihe | |
| 3,020,946 A | 2/1962 | Mills | |
| 3,217,772 A * | 11/1965 | Adams | 411/112 |
| 3,219,086 A | 11/1965 | Zahodiakin | |
| 3,259,165 A | 7/1966 | Tobian et al. | |
| 3,356,404 A | 12/1967 | Peters | |
| 3,478,801 A | 11/1969 | Van Niel | |
| 3,670,796 A | 6/1972 | Grimm | |
| 3,700,020 A | 10/1972 | Wallace | |
| 4,094,352 A | 6/1978 | Hlinsky | |
| 4,193,435 A | 3/1980 | Frosch et al. | |
| 4,219,064 A | 8/1980 | Lozano | |
| 4,488,844 A | 12/1984 | Baubles | |

(Continued)

FOREIGN PATENT DOCUMENTS

CH    482 929    12/1969

(Continued)

OTHER PUBLICATIONS

WIPO, International Search Report, Jan. 14, 2009, PCT/US2008/083287.

(Continued)

*Primary Examiner* — Gary Estremsky
(74) *Attorney, Agent, or Firm* — Henricks, Slavin & Holmes LLP

(57) ABSTRACT

Methods relating to and apparatus such as floating nut plates may include complementary surfaces limiting movement of a retainer toward or away from side walls of a receiver, such as wherein a nut element is positioned between the retainer and the receiver. One of the complementary surfaces may be a groove formed in the retainer. In one configuration, the receiver and/or retainer are non-metal.

48 Claims, 14 Drawing Sheets

U.S. PATENT DOCUMENTS

| | | | |
|---|---|---|---|
| 4,676,706 A | 6/1987 | Inaba | |
| 4,695,212 A | 9/1987 | Berecz | |
| 4,730,967 A | 3/1988 | Warkentin | |
| 4,755,090 A | 7/1988 | Macfee et al. | |
| 4,768,907 A | 9/1988 | Gauron | |
| 4,863,327 A | 9/1989 | Poupiter | |
| 4,895,484 A * | 1/1990 | Wilcox | 411/85 |
| 4,973,208 A | 11/1990 | Gauron | |
| 5,022,804 A | 6/1991 | Peterson | |
| 5,067,863 A | 11/1991 | Kowalski | |
| 5,154,385 A | 10/1992 | Lindberg et al. | |
| 5,190,423 A | 3/1993 | Ewing | |
| 5,193,868 A | 3/1993 | O'Toole | |
| 5,245,743 A | 9/1993 | Landy et al. | |
| 5,324,146 A | 6/1994 | Parenti et al. | |
| 5,378,099 A | 1/1995 | Gauron | |
| 5,489,173 A | 2/1996 | Hofle | |
| 5,507,610 A | 4/1996 | Benedetti et al. | |
| 5,624,319 A | 4/1997 | Golczyk et al. | |
| 5,630,686 A * | 5/1997 | Billmann | 411/112 |
| 5,632,582 A | 5/1997 | Gauron | |
| 5,716,178 A | 2/1998 | Vu | |
| 5,820,322 A | 10/1998 | Hermann et al. | |
| 5,893,694 A | 4/1999 | Wilusz et al. | |
| 5,928,711 A | 7/1999 | Wallace et al. | |
| 5,947,518 A | 9/1999 | Redman et al. | |
| 6,146,071 A | 11/2000 | Norkus et al. | |
| 6,474,917 B2 | 11/2002 | Gauron | |
| 6,726,117 B2 * | 4/2004 | Herb et al. | 238/315 |
| 6,854,941 B2 | 2/2005 | Csik | |
| 6,872,038 B2 | 3/2005 | Westlake | |
| 6,918,725 B2 | 7/2005 | Gauron | |
| 7,044,701 B2 * | 5/2006 | Herb | 411/84 |
| 7,052,222 B2 | 5/2006 | Muller et al. | |
| 7,101,131 B2 * | 9/2006 | Herb | 411/84 |
| 7,128,511 B2 | 10/2006 | Hewgill | |
| 7,192,231 B2 | 3/2007 | Blackaby | |
| 7,309,200 B2 * | 12/2007 | Schmieder et al. | 411/103 |
| 2004/0013492 A1 | 1/2004 | Clinch et al. | |
| 2004/0165943 A1 | 8/2004 | Herb | |
| 2004/0165965 A1 * | 8/2004 | Unverzagt et al. | 411/84 |
| 2004/0202523 A1 | 10/2004 | Csik | |
| 2008/0310931 A1 | 12/2008 | Csik et al. | |
| 2009/0103997 A1 | 4/2009 | Csik et al. | |

FOREIGN PATENT DOCUMENTS

| | | |
|---|---|---|
| GB | 565192 | 10/1944 |
| GB | 585948 | 3/1947 |
| GB | 782428 | 9/1957 |
| JP | 2006-38201 | 2/2006 |
| WO | WO2009064818 A1 | 5/2009 |

OTHER PUBLICATIONS

Lisi Aerospace, Nutplate, Self-Locking, Floating, Spring Loaded, A286 Nut Element, Drawing, May 26, 1999, Sheet 1, 187010 (material and notes redacted).

Lisi Aerospace, Nutplate, Self-Locking, Floating, Spring Loaded, A286 Nut Element, Photos of Parts and Assembly, made per Drawing dated May 26, 1999.

* cited by examiner

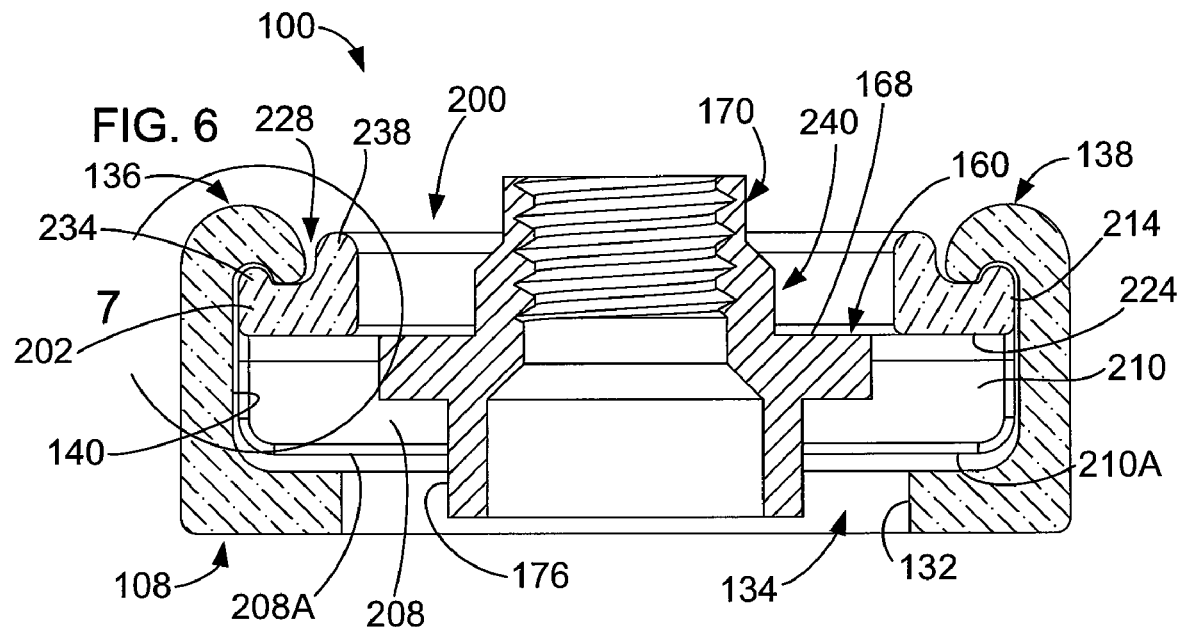
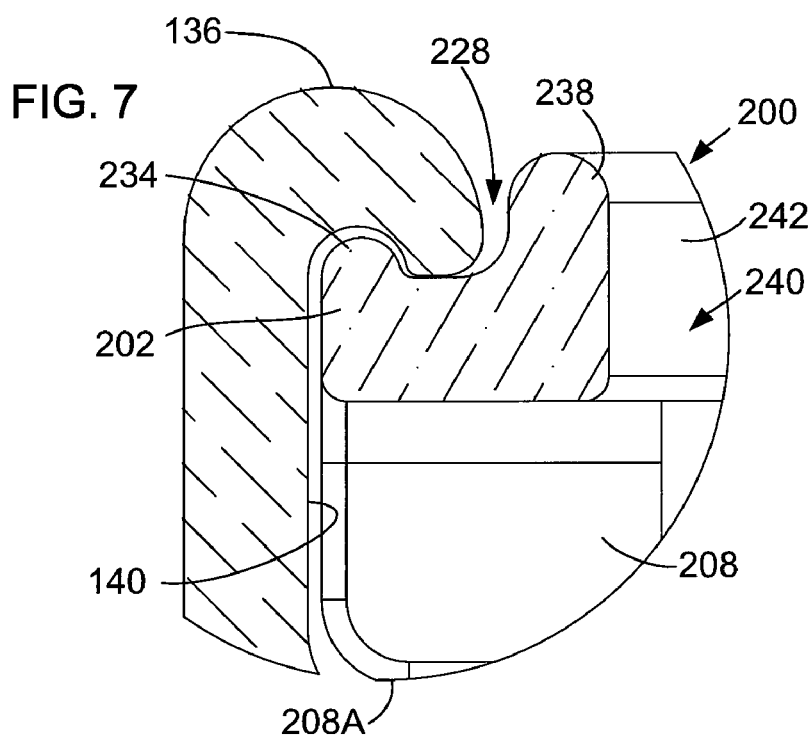

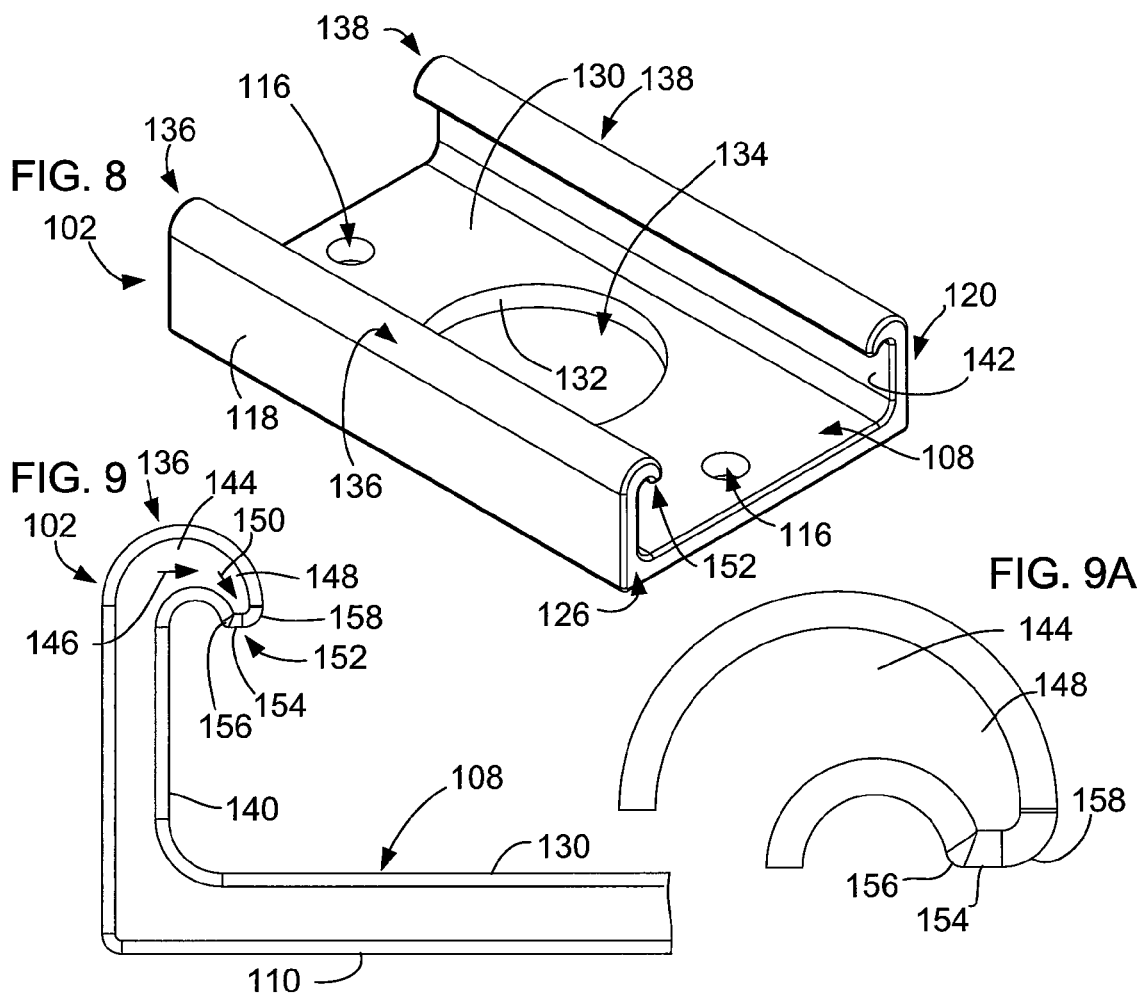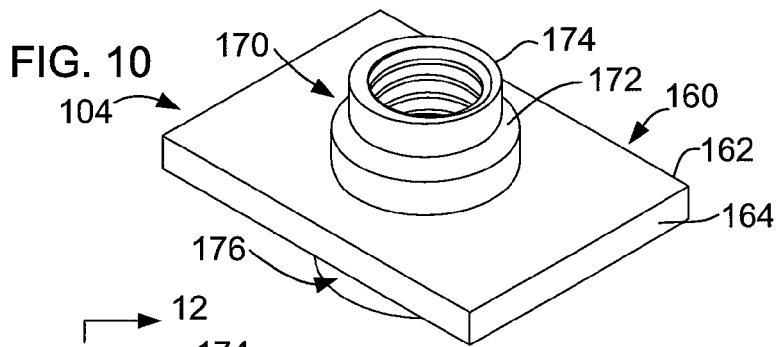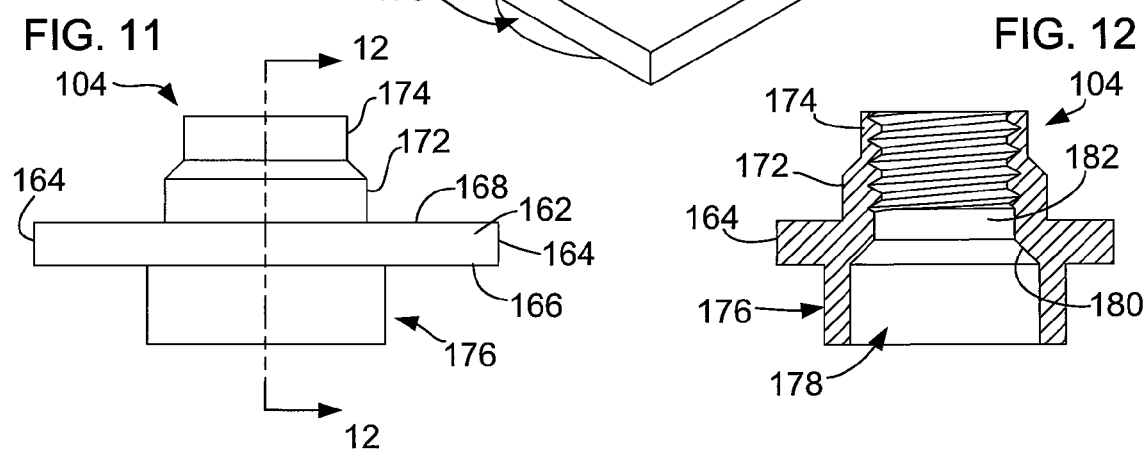

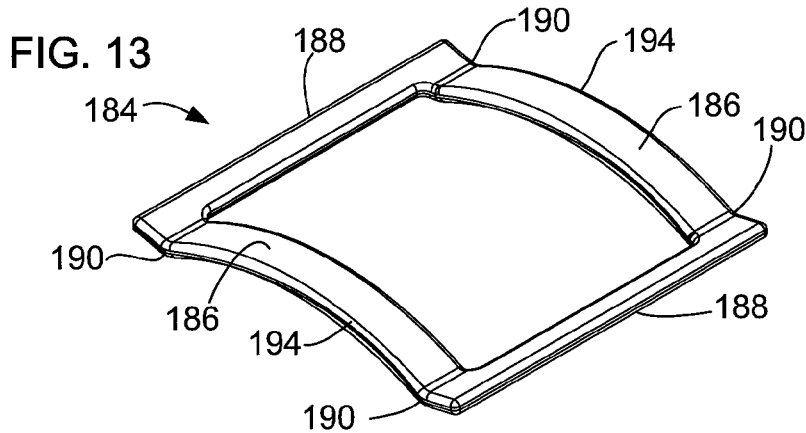
FIG. 13
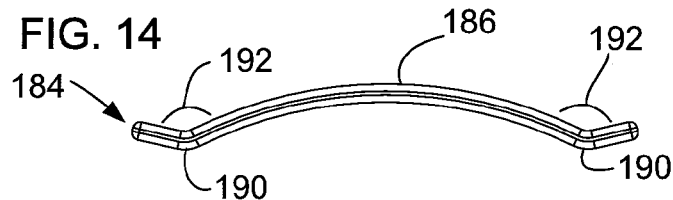
FIG. 14
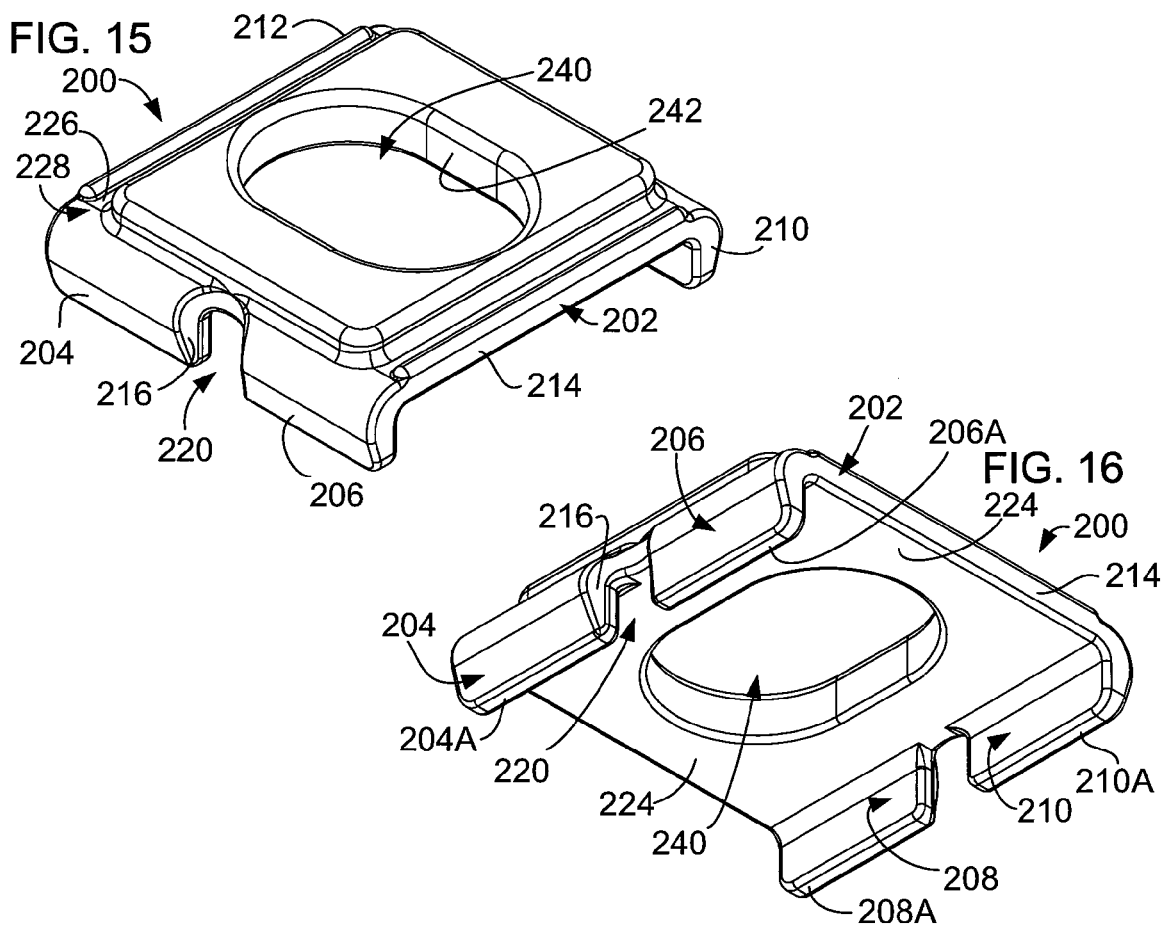
FIG. 15
FIG. 16

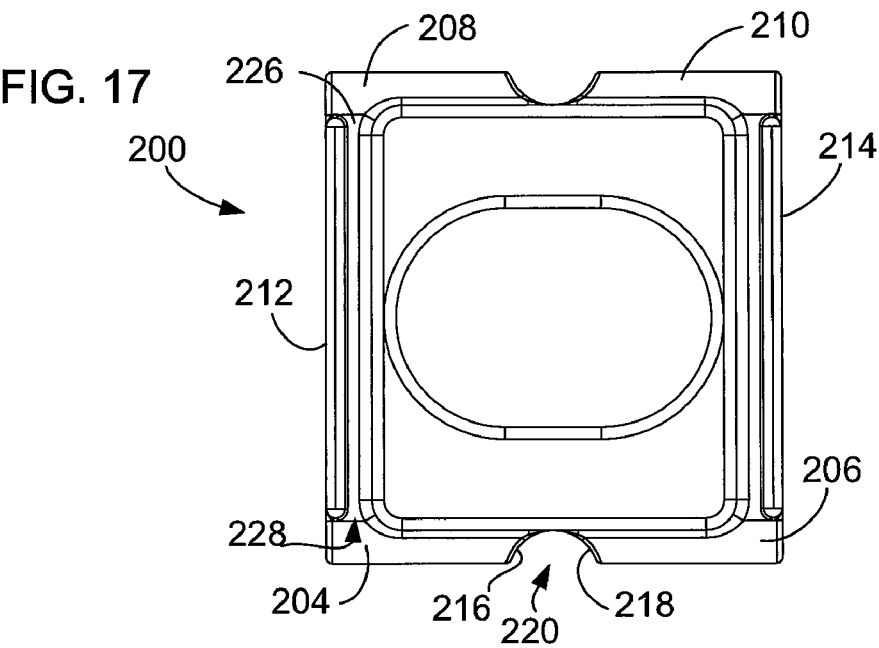
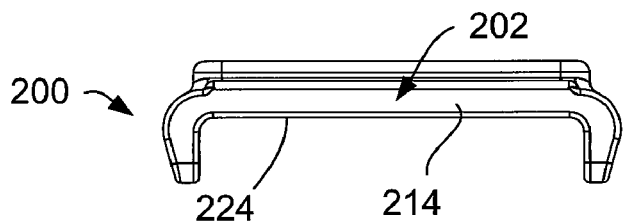
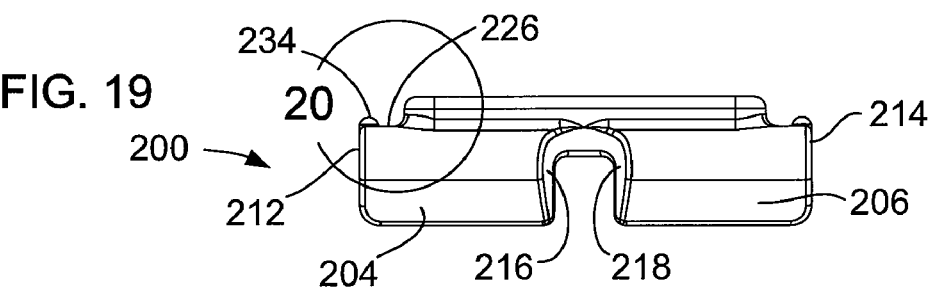
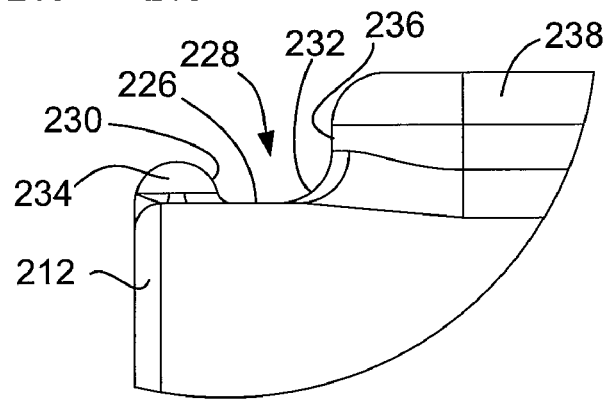

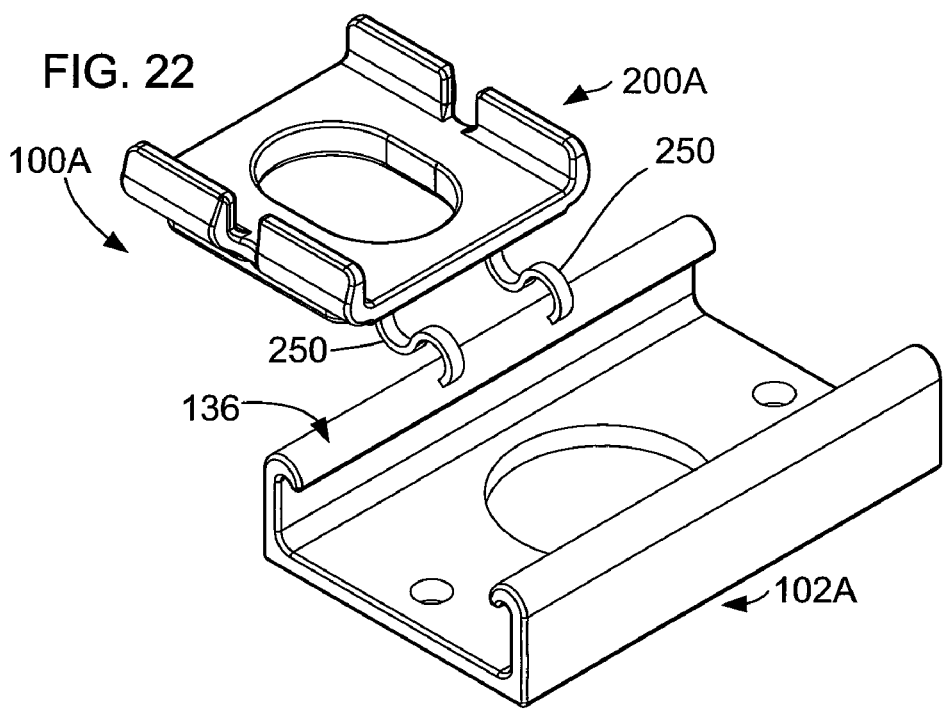
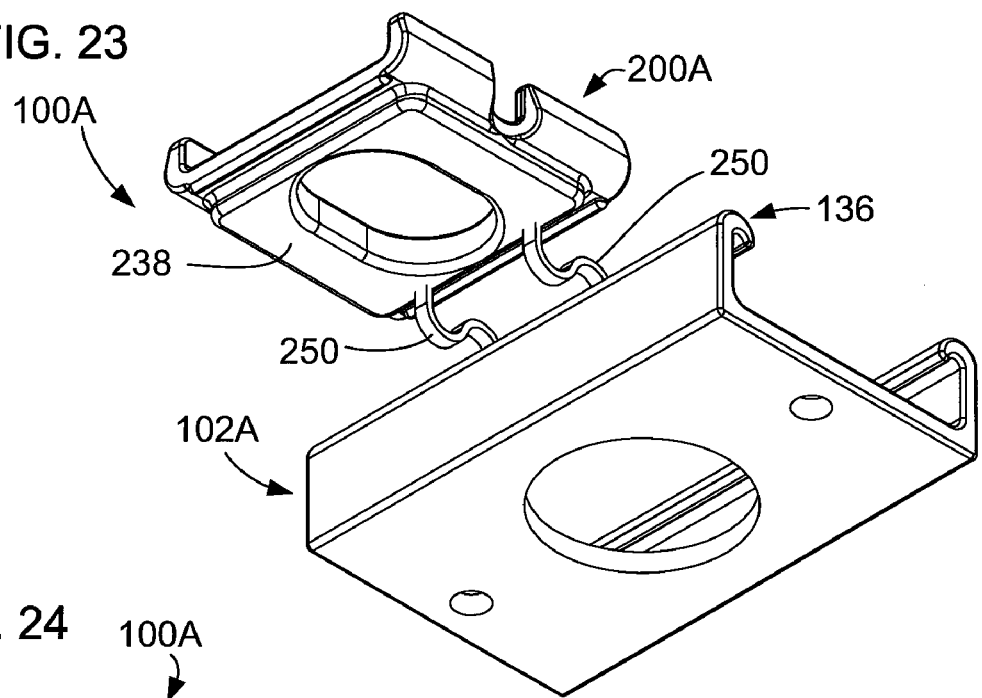
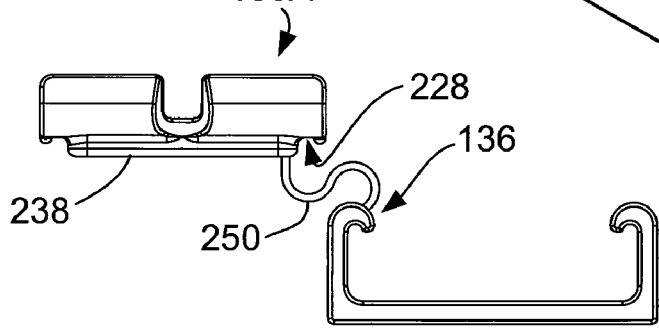

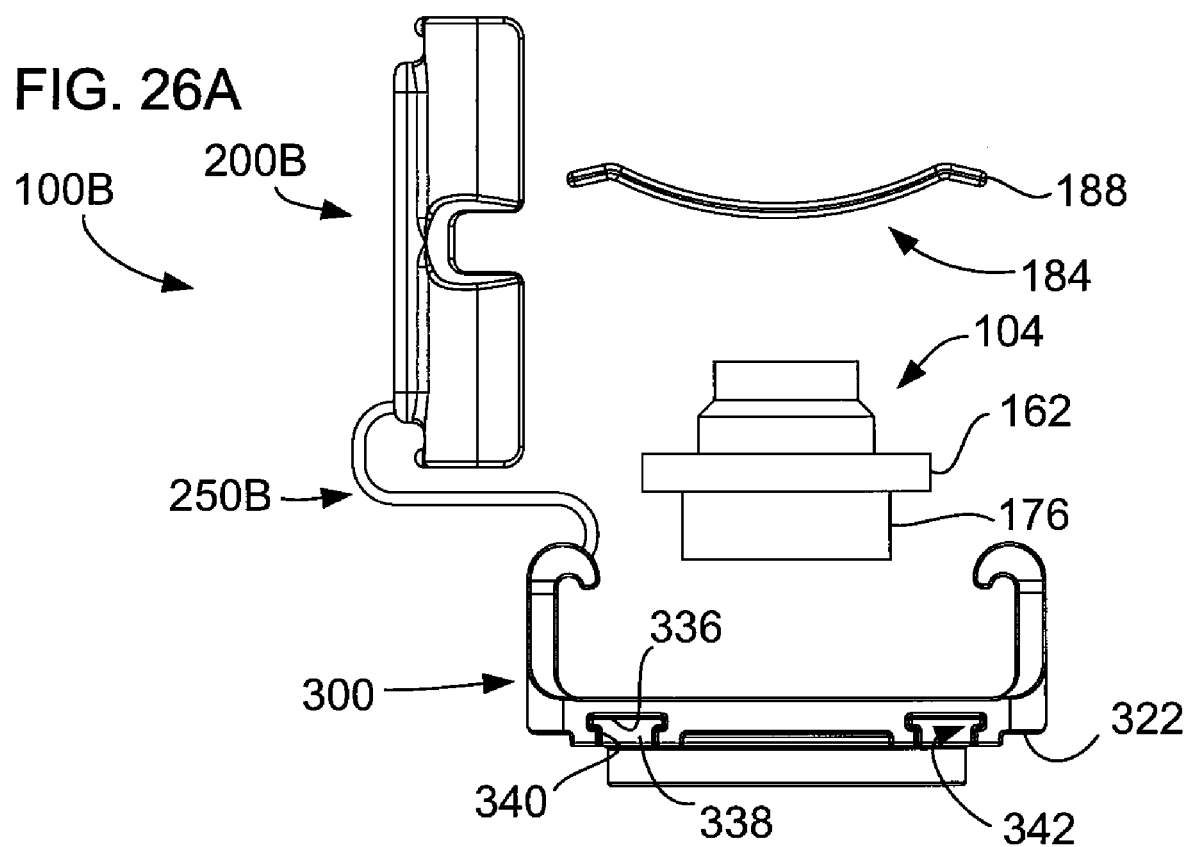

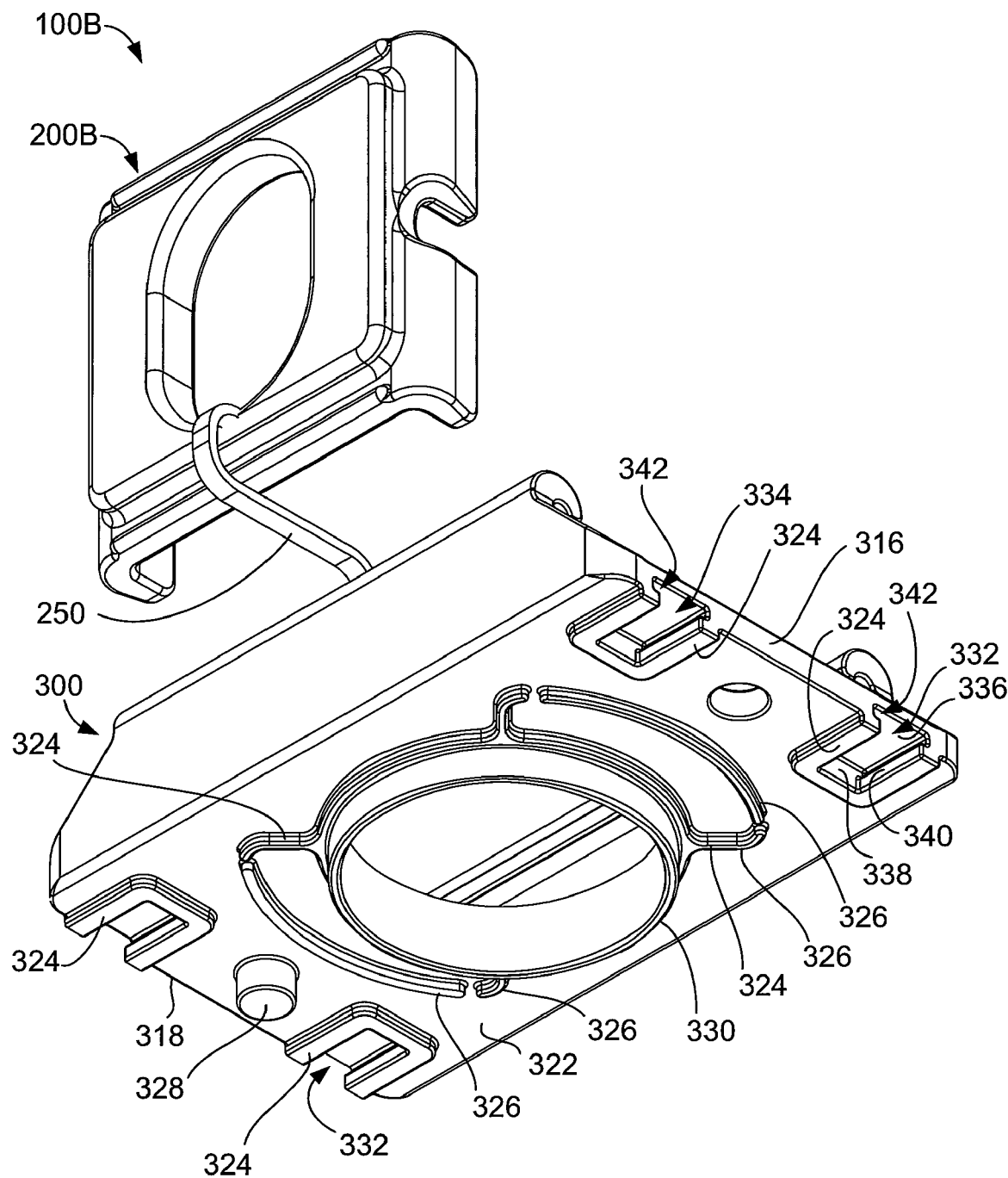

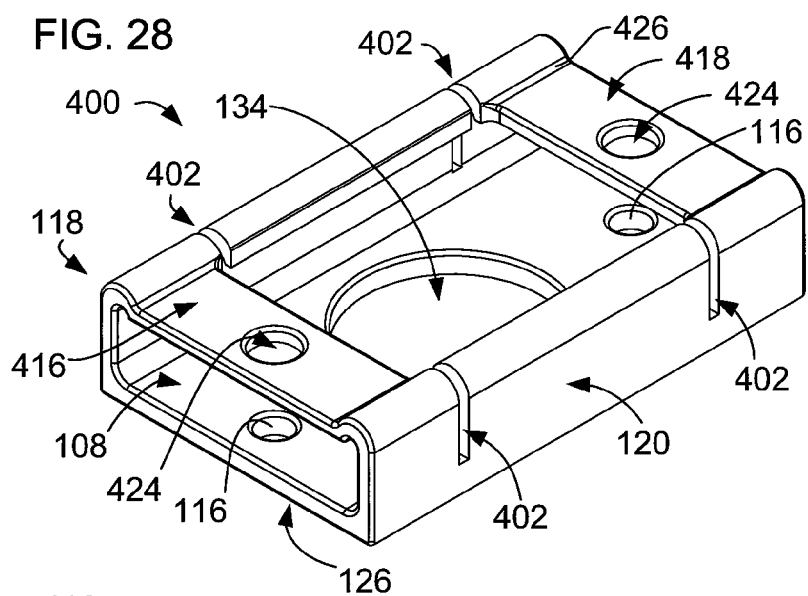
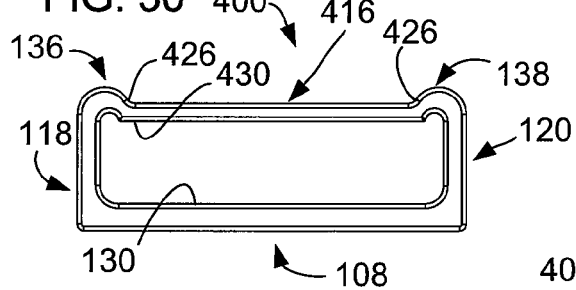
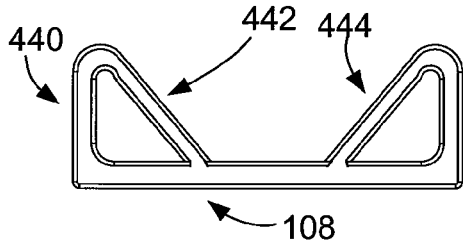
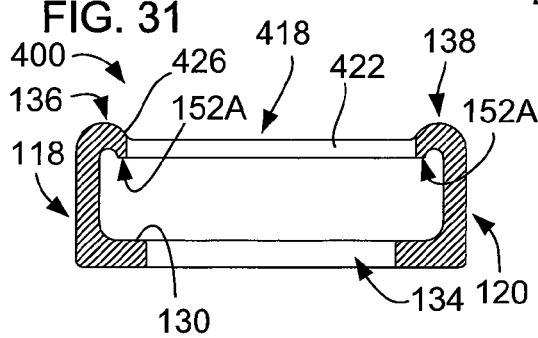
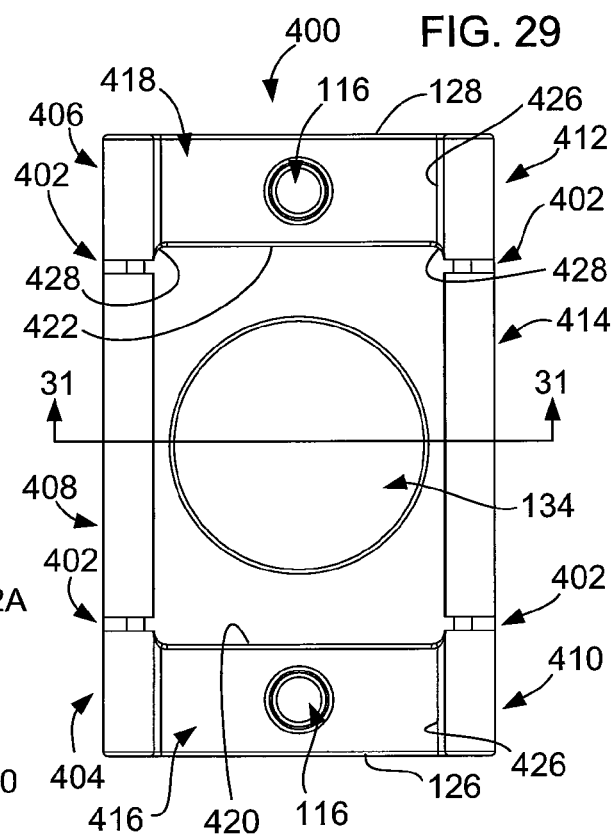

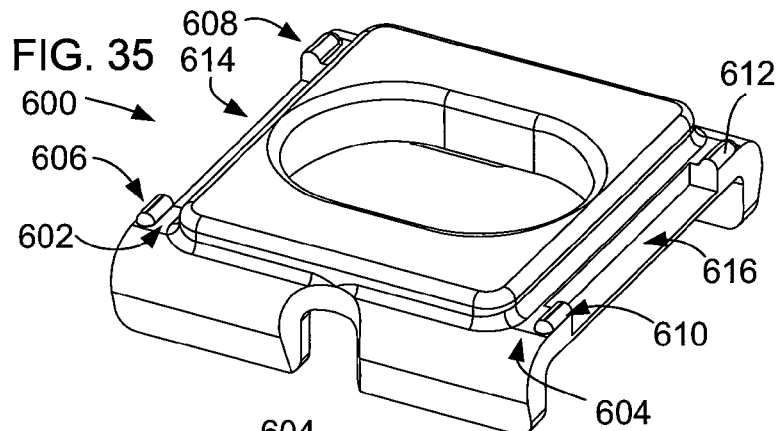
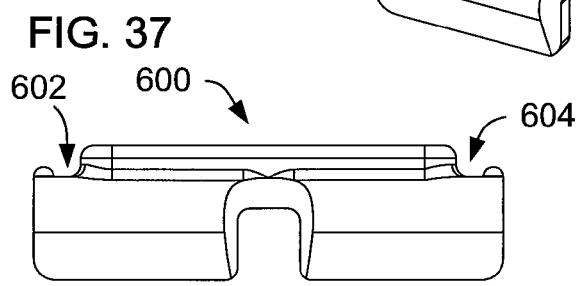
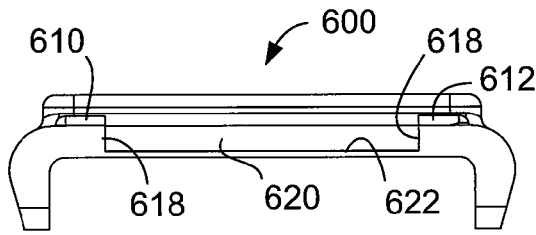
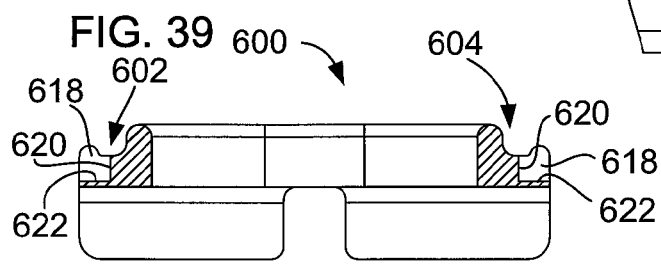
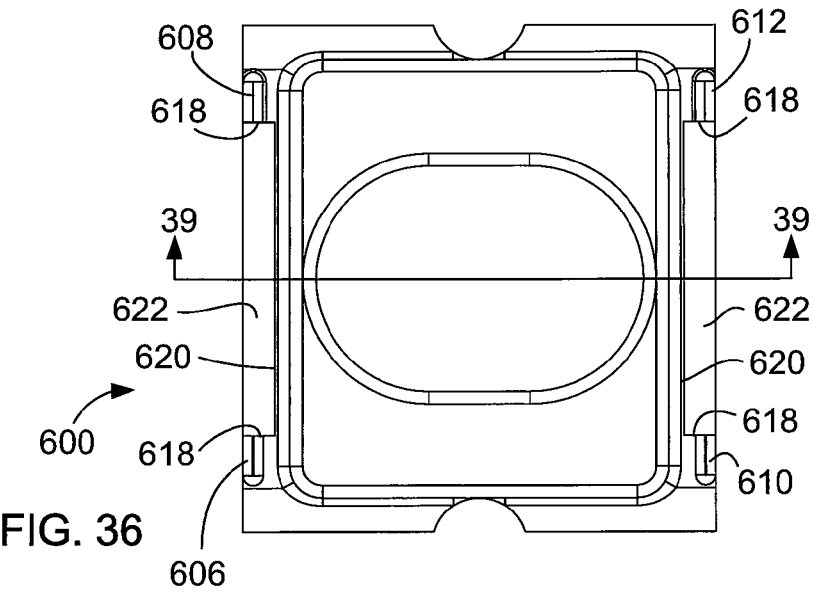

FLOATING NUT PLATE

BACKGROUND

1. Field

These inventions relate to floating nut plates and other fastener assemblies.

2. Related Art

Floating nut plates include a base or bottom plate with an opening and supporting a nut or similar fastener element, which is captured on the base by a retainer, canopy or cage element. The nut plate helps to hold components, for example panels, together when a fastener is engaged with the nut and tightened down, while still allowing movement between elements, for example in an assembly such as a wing-body fairing joint. The nut receives a bolt, screw or other threaded element passed through the opening and threaded into the nut. The opening is sized sufficiently to allow the nut and bolt to move laterally to accommodate expected movement between the elements being secured. Floating nut plates may be used in vehicles and aircraft, as well as in other applications.

In aircraft applications, the types and numbers of fasteners add significant weight to the final assembly. Panel fasteners, for example, may have a number of parts, most or all of which are metal. Metal is used for strength and other factors. However, the metal parts add appreciable weight to the final assembly. If the weight of a given part could be reduced, because of the number of individual parts, even small weight reductions in an individual component may add up to a significant weight reduction overall. Additionally, some metal materials may experience some corrosion and may also be incompatible with surrounding materials.

SUMMARY

Floating nut plate assemblies are described that are easy to assemble, lightweight and more corrosion resistant than many conventional floating nut plates. Additionally, the assembly may be configured to be more compatible with composite structures. One or more of the described assemblies may also be easier to manufacture.

In one example of a nut plate assembly, a nut plate receiver includes side walls having respective end or edge portions. A nut element is positioned in an area between a base of the receiver and tops of the side walls. An element, such as a nut element retainer, helps to keep the nut element within a desired area of the assembly, while still allowing the nut element to move within the area. In one configuration, a nut element retainer includes contact surfaces for contacting the respective end portions of the receiver. In one example of the configuration, the contact surfaces and the respective end portions are configured so that the retainer is substantially limited from movement toward one or more of the side walls. In another example of the configuration, the contact surfaces and the respective end portions are configured so that the retainer is substantially limited from movement both upward and from movement toward one or more of the side walls. In a further example of the configuration, the contact surfaces include grooves for interacting with the end portions. The grooves may be on opposite sides or edges of the retainer, and may also be on opposite sides of an opening for receiving part of the nut element. A bias element such as a spring element may be included, and positioned between the nut element and the receiver base, or between the nut element and the retainer.

In another example of a nut plate assembly, the assembly can include a receiver having side walls extending upwardly from a support portion, and at least one of the side walls includes a portion extending toward the other side wall and downward, such as toward the support portion. A nut element is supported by the receiver. A retainer is configured to contact the portion of the side wall that extends downward and to limit movement of the retainer one or more of toward or away from the side wall and longitudinally. In one configuration, the retainer is configured to also limit upward movement of the retainer away from the receiver.

In one or more of the examples herein, the receiver support portion can be substantially planar, and can be substantially rectangular. The receiver can have an underlying surface to be placed against a support structure, and can be mounted to the support structure through various means, including fasteners, adhesives or other bonding agents or other fixing means. The side walls can extend upwardly substantially perpendicular to the receiver support portions, and one or both of the side walls can include inwardly curving and downwardly extending wall portions. The downwardly extending wall portions can face the receiver support surface and extend in a direction substantially perpendicular to the receiver support surface. The downwardly extending wall portions can terminate in a free edge, for example one that extends in a substantially straight line, that may be in one example substantially parallel to the receiver support surface. The free edge may contact, engage or interface with a corresponding surface on the retainer, for example in a way that limits movement of the retainer upward away from the support surface and/or toward or away from a side wall. In one example, the corresponding surface on the retainer may be a groove or other depression formed into an upper surface of the retainer. The retainer includes an upper-most surface that is further away from the receiver support surface than is the bottom of the groove or other depression. The receiver and/or the retainer may be formed from plastic or other non-metal, including those identified herein. The receiver and retainer may be configured to allow the retainer to move in a direction parallel to the side walls but to substantially prevent retainer movement upward or toward or away from the side walls.

In another example, a floating nut plate assembly can be assembled by placing a nut in a receiver and placing a retainer over the nut. One side of the retainer is placed into contact with a complementary configured side wall portion of the receiver, and the other side of the retainer is depressed toward the receiver until the other side of the retainer is below a second side wall portion of the receiver. In one example, placing one side of the receiver into contact with a complementary configured side wall portion of the receiver includes inter-engaging portions of the receiver and the retainer so as to limit movement of the retainer toward the side wall. In another example, positioning the retainer below spaced apart side walls of the receiver substantially limits movement of the retainer toward or away from the side walls. Additionally, positioning the retainer below spaced apart side walls of the receiver also substantially limits upward movement of the retainer away from the receiver. A bias element may be positioned between the receiver and the nut element, or between the nut element and the retainer.

These and other examples are set forth more fully below in conjunction with drawings, a brief description of which follows.

BRIEF DESCRIPTION OF THE DRAWINGS

FIG. 6 is a transverse sectional view of the nut plate assembly taken along line 6-6 of FIG. 4.

FIG. 7 is a detail view of a portion of the nut plate assembly taken as shown in FIG. 6.

FIG. 8 is an upper left isometric view of a receiver for use in the nut plate assembly of FIG. 2.

FIG. 9 is an end and cut away view of a portion of the receiver of FIG. 8.

FIG. 9A is a detailed view of part of the receiver portion of FIG. 9

FIG. 10 is an upper isometric view of a nut element for use in the assembly of FIG. 2.

FIG. 11 is a side elevation view of the nut element of FIG. 10.

FIG. 12 is a transverse sectional view of the nut element of FIG. 10 taken along line 12-12 of FIG. 11.

FIG. 13 is an upper isometric view of a bias element for use in the assembly of FIG. 2.

FIG. 14 is an end elevation view of the bias element of FIG. 13.

FIG. 15 is an upper isometric view of a retainer for use in the assembly of FIG. 2.

FIG. 16 is a lower isometric view of the retainer of FIG. 15.

FIG. 17 is a top plan view of the retainer of FIG. 15.

FIG. 18 is a side elevation view of the retainer of FIG. 15.

FIG. 19 is an end elevation view of the retainer of FIG. 15.

FIG. 20 is a detail of a portion of the retainer of FIG. 15 taken as shown in FIG. 19.

FIG. 21A is a top view of a horizontal section of the assembly of FIG. 1 showing a first possible position of the nut and retainer.

FIG. 21B is a top view of a horizontal section of the assembly similar to that shown in FIG. 21A showing another possible position of the nut and retainer.

FIG. 21C is a top view of a horizontal section of the assembly similar to that shown in FIG. 21A showing another possible position of the nut and retainer.

FIG. 21D is a top view of a horizontal section of the assembly similar to that shown in FIG. 21A showing another possible position of the nut and retainer.

FIG. 22 is an upper right isometric view of another example of a receiver and retainer combination for use in a floating nut plate assembly.

FIG. 23 is a lower left isometric view of the combination showing FIG. 22.

FIG. 24 is an end elevation view of the combination of FIG. 22.

FIG. 26A is an end elevation view of alternative configuration of the floating nut plate assembly of FIG. 25.

FIG. 27 is a lower isometric view of the receiver and retainer combination for use in the assembly of FIG. 25.

FIG. 28 is an upper right isometric view of an alternative receiver for use in a nut plate assembly in accordance with another example.

FIG. 29 is a top plan view of the receiver of FIG. 28.

FIG. 30 is an end elevation view of the receiver of FIG. 28.

FIG. 30A is an end elevation view of a receiver in accordance with a configuration alternative to that shown in FIGS. 28-30.

FIG. 31 is a vertical transverse section of the receiver of FIG. 28 taken along line 31-31 of FIG. 29.

FIG. 35 is an upper right isometric view of an alternative housing for use with a receiver of FIG. 32.

FIG. 36 is a top plan view of the housing of FIG. 35.

FIG. 37 is an end elevation view of the housing of FIG. 35.

FIG. 38 is a side elevation view of the housing of FIG. 35.

FIG. 39 is a vertical transverse section of the housing of FIG. 35 taken along line 39-39 of FIG. 36.

DETAILED DESCRIPTION

Figure 1:
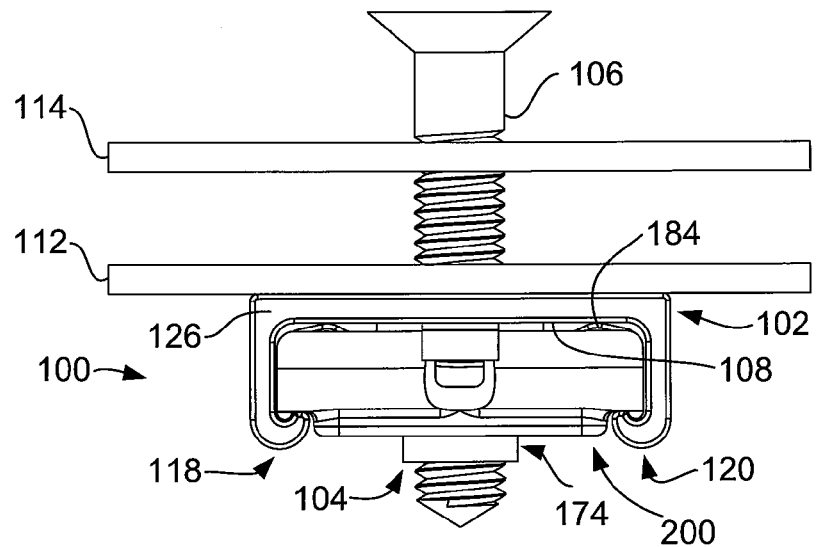
FIG. 1 is a side elevation view of a floating nut plate assembly installation.
Figure 2:
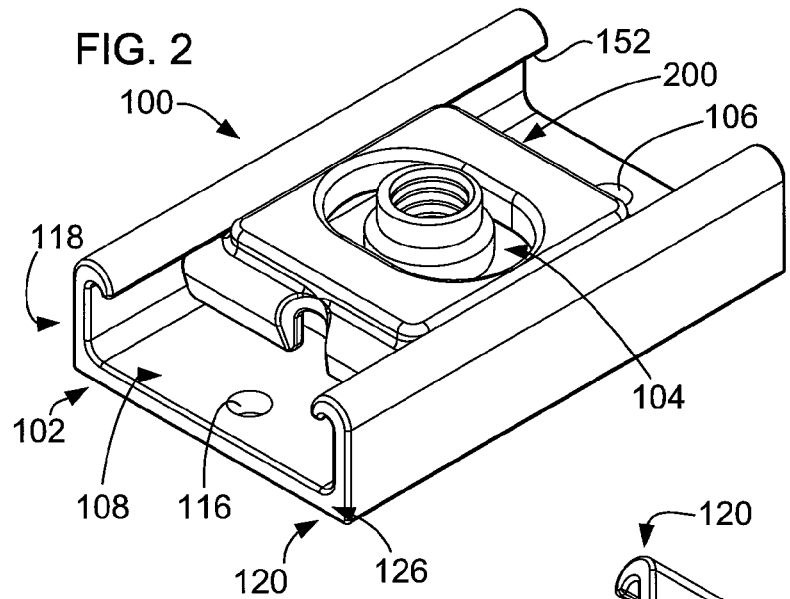
FIG. 2 is an upper right isometric view of a nut plate assembly such as may be used in the installation of FIG. 1.
Figure 3:
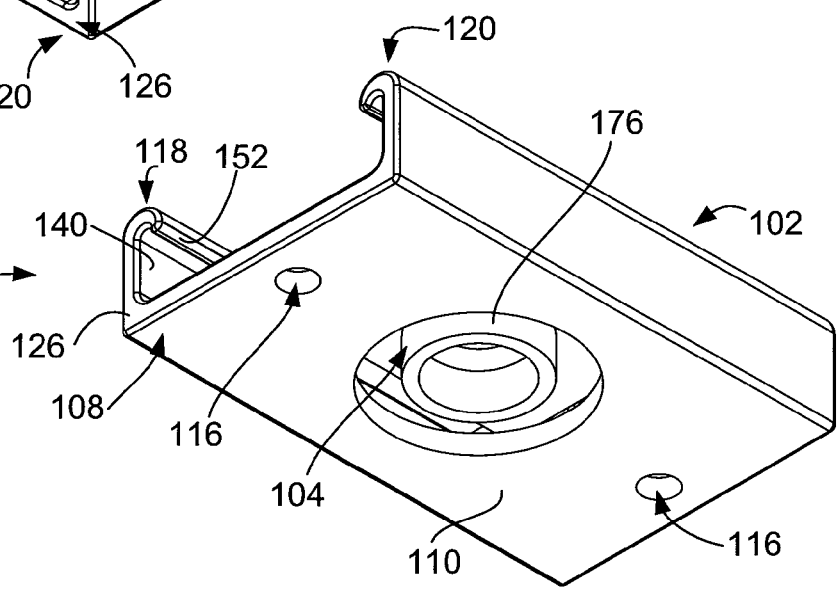
FIG. 3 is a lower right isometric view of the nut plate assembly of FIG. 2.

This specification taken in conjunction with the drawings sets forth examples of apparatus and methods incorporating one or more aspects of the present inventions in such a manner that any person skilled in the art can make and use the inventions. The examples provide the best modes contemplated for carrying out the inventions, although it should be understood that various modifications can be accomplished within the parameters of the present inventions.

Examples of floating nut plates and of methods of making and using the floating nut plates are described. Depending on what feature or features are incorporated in a given structure or a given method, benefits can be achieved in the structure or the method. For example, floating nut plates using one or more non-metal (for example plastic) components may be easier to use and maintain, and may be lighter weight and less likely to corrode or react with other surrounding materials. Additionally, some floating nut plate configurations may also benefit from more reliable functioning, improved material compatibility and corrosion resistance, and reduced wear.

In some configurations of floating nut plates, improvements can be achieved also in assembly, and in some configurations, fewer components can be used while still providing the desired functional features.

These and other benefits will become more apparent with consideration of the description of the examples herein. However, it should be understood that not all of the benefits or features discussed with respect to a particular example must be incorporated into a floating nut plate, component or method in order to achieve one or more benefits contemplated by these examples. Additionally, it should be understood that features of the examples can be incorporated into a floating nut plate, component or method to achieve some measure of a given benefit even though the benefit may not be optimal compared to other possible configurations. For example, one or more benefits may not be optimized for a given configuration in order to achieve cost reductions, efficiencies or for other reasons known to the person settling on a particular product configuration or method.

Examples of a number of floating nut plate configurations and of methods of making and using the floating nut plates are described herein, and some have particular benefits in being used together. However, even though these apparatus and methods are considered together at this point, there is no requirement that they be combined, used together, or that one component or method be used with any other component or method, or combination. Additionally, it will be understood that a given component or method could be combined with other structures or methods not expressly discussed herein while still achieving desirable results.

It should be understood that terminology used for orientation, such as front, rear, side, left and right, upper and lower, and the like, are used herein merely for ease of understanding and reference, for example with reference to the drawings, and are not used as exclusive terms for the structures being described and illustrated.

In one example of a fastener assembly (FIGS. 1-21D), a fastener assembly in the form of a floating nut plate assembly 100 (FIGS. 1-5) includes a fastener cage or receiver 102 (see also FIGS. 8-9) supporting a fastener element, in the present example a nut element 104 (see also FIGS. 10-12). The nut element receives a complementary fastener such as bolt 106 (FIG. 1), threaded into the nut element 104. The fastener assembly may or may not include the bolt 106, depending on whether or not the assembly is combined and sold with or without the bolt, for example.

The receiver 102 includes a base 108 having an outward facing surface 110 (FIGS. 3 and 9) for being supported on a support surface 112 (FIG. 1). The support surface 112 may be a frame structure, or other structural support. The bolt 106 extends through a panel or other component 114 and threads into the nut element 104 for securing the component to the structure 112. In other configurations, the nut element 104 and the bolt 106 may be otherwise configured to be secured together through means other than threads, such as detents, pins and grooves, latches, locking elements or the like.

The outward facing surface 110 may be formed on a mounting plate, planar member, tab or tab combination, a plurality of wings, or other surfaces for helping to support the receiver on the support surface 112. In the present examples, the outward facing surface 110 is formed on the base 108, which is a substantially planar plate member, and the outward facing surface 110 is substantially flat. The base 108 includes structures for mounting the base to the support surface 112. In one example, the base 108 includes openings 116 (FIGS. 2-4 and 8) for receiving fasteners, for example rivets, threaded fasteners, and the like. The openings can be reinforced with respective eyelets (not shown), which may have cylindrical walls extending into the openings 116 and a perpendicular rim extending outward from the cylindrical wall overlying the upper surface of the base or recessed into the surface. In addition, or alternatively, the openings can help to hold adhesives, films, double-stick tape or other pressure sensitive adhesives, or other bonding elements for holding the nut plate on the support surface. In the examples of bonding agents or adhesives that might be flowable, such material may extend into the openings, may extend over the upper edges of the openings, and may also extend over part or all of the upper surfaces of the base. Contact of the material with the adjacent surface(s) of the base help to hold the assembly in place. Engagement between the material and the adjacent edges of the receiver help to hold the assembly in place. Eyelets may be used in or around the openings to help resist loading forces that may be experienced through the receiver when held in place through the mounting fasteners. Where adhesives, films, double-stick tape or other pressure sensitive adhesives, or other adhesives, or other bonding elements are used, openings can also be omitted, with the bonding element holding the receiver to the support surface through an appropriate bonding surface on the receiver.

The outward-facing surface 110 can incorporate a smooth or non-smooth surface adjacent to the intended support surface. A non-smooth surface can be textured, roughened, knurled, abraded, peened, inclusive of one or more projections or depressions, or otherwise varied. This non-smooth surface condition may improve the strength characteristics when joined to the support surface. The improved strength characteristics relate to the effectiveness of the attachment method of the assembly with the intended support surface, which can include but is not limited to, peel, push-out, torque-out, and incidental jarring or hitting (with another object) of the attached nut plate.

Figure 4:
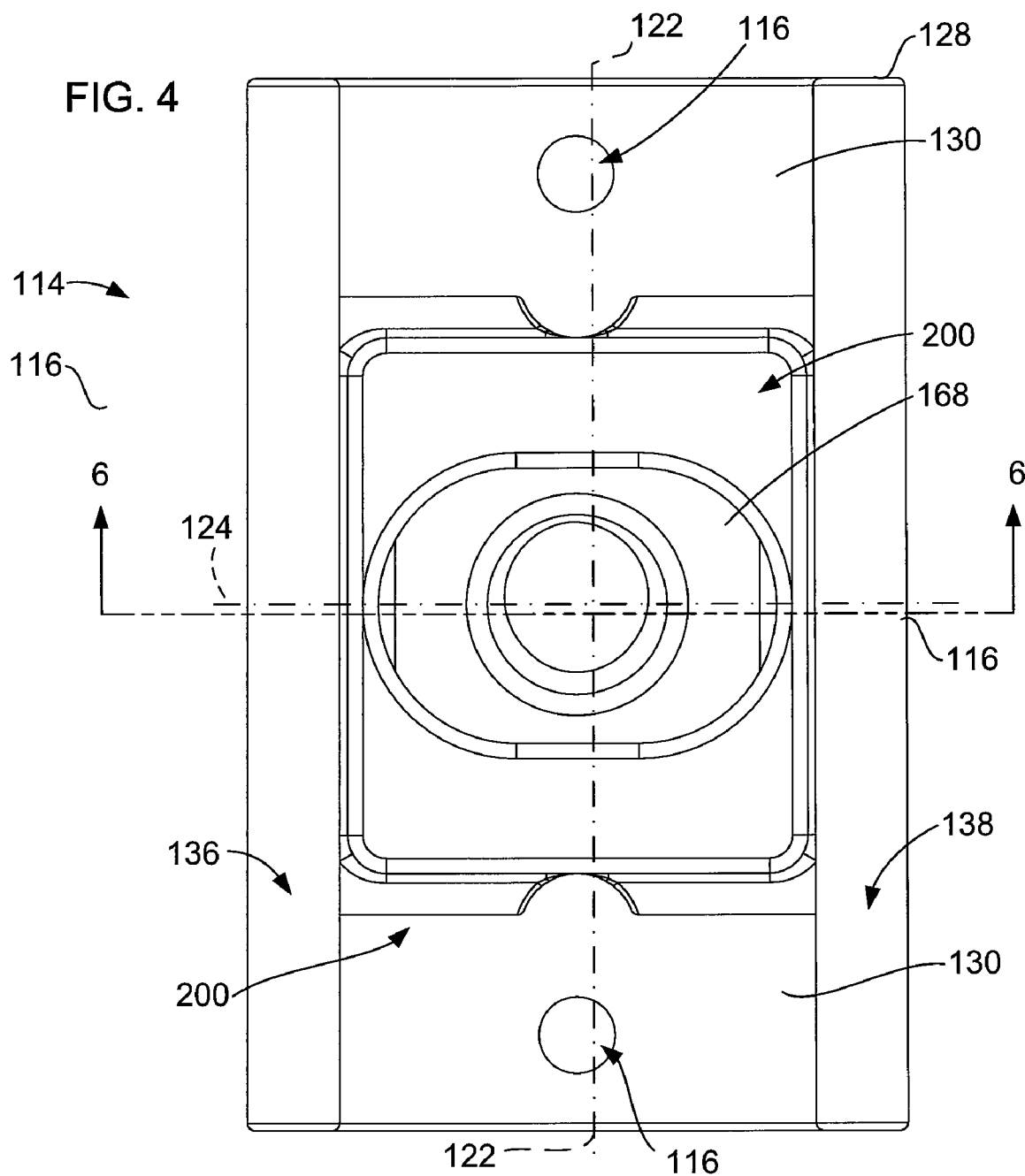
FIG. 4 is a top plan view of the nut plate assembly of FIG. 2.
Figure 5:
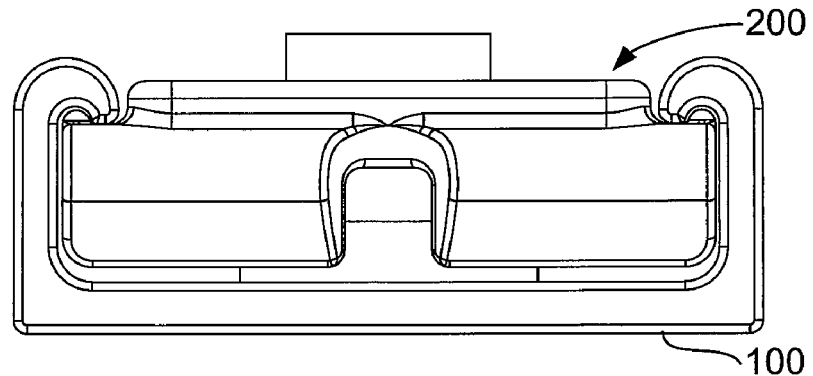
FIG. 5 is an end elevation view of the nut plate assembly of FIG. 2.

In the present example, the base 108 is a substantially planar structure having a rectangular bottom profile, with one dimension extending from a left side 118 to a right side 120. The receiver 102 is substantially symmetric about a longitudinal axis 122, and also substantially symmetric about a transverse axis 124 (FIG. 4). Therefore, "right" and "left" and the sides are referred to herein with respect to the drawings for reference and ease of understanding, and they do not represent a particular orientation of the assembly. The base extends from a first end surface 126 (FIG. 1-4) to a second end surface 128. In plan view (FIG. 4), the first and second ends are substantially straight and parallel to each other, as are the left and right sides. However, the first and second end surfaces can have other configurations and may extend beyond the ends of the left and right sides, and they may also have other than straight surfaces or flat surfaces. It should also be noted that the left and right sides can also be other than straight while still preferably having substantially straight edges for engaging a housing, as described more fully below, to allow a housing to move longitudinally of the receiver. However, straight left and right sides along with straight longitudinal edges are easier to manufacture, and they allow easier assembly of the parts.

Considering the receiver 102 in more detail (FIGS. 2-9), the substantially flat rectangular bottom surface 110 ends at the first end wall 126 and the second end wall 128, and joins the left and right side walls 118 and 120, respectively. The outside surfaces of the end walls and the side walls are substantially flat in the example shown in FIGS. 2-9, and extend substantially perpendicular to the bottom surface 110. The openings 116 are formed near the end surfaces and approximately on the longitudinal center line of the axis 122. The configuration of the bond surface 110 can be selected to provide reliable and secure positioning on and support by the underlying support structure. The positioning of the openings 116 may be a function of the available space and the desired range of movement of the nut element 104.

As shown in FIGS. 8 and 9, the base 108 includes a receiver support surface 130. The support surface 130 is preferably substantially flat and smooth between the end walls and the side walls, and also has a substantially rectangular configuration. The support surface 130 supports and allows a sliding movement of the nut element 104 over the support surface, including from side to side and in the direction of the longitudinal axis 122 as well as directions in between. The support surface 130 extends a length and width sufficient to allow the desired movement of the nut element 104 over the surface.

A substantially circular wall 132 defines an opening 134 and substantially larger than a guide portion on the nut element 104 (described more fully below). The opening 134 is substantially centered about the intersection of the longitudinal and transverse axes 122 and 124. Depending on the size of the guide portion of the nut element, the opening 134 is sized to permit the desired movement of the nut element over the support surface 130. If the nut element guide portion is omitted, the opening 134 can be made smaller but is sized to accommodate the outside diameter of the fastener 106 and the desired lateral float or lateral movement of the nut element over the surface 130 ("lateral" here referring to the full range of movement horizontally over the surface 130, as opposed to "side-to-side" movement and distinguished from a vertical float).

The left and right side walls 118 and 120, respectively, extend substantially straight upward from the base 108 and to respective upper walls 136 and 138, respectively. The left and right side walls are substantially identical to each other, though mirror images, and each have a substantially constant thickness and height. The inside surfaces 140 and 142, respectively, are also preferably flat and vertical except for where each joins the surface 130, at which point they have a radius defining the transition between the inside surface of the side wall and the support surface 130.

As each side wall is substantially identical to the other, aside from being mirror images, only one side wall will be described. The upper wall 136 includes an inward portion 144 that curves inwardly toward the opposite side wall 120, in the direction shown by the arrow 146 in FIG. 9. The inward portion 144 extends a distance sufficient to extend over a portion of the housing, described more fully below. The upper wall includes a downward portion or a depending portion 148, extending in the direction of arrow 150. The upper wall terminates in a substantially straight edge 152, the lowest point of which faces vertically downward to the support surface 130 of the base 108. In the configuration shown in FIG. 9, the termination includes a substantially straight bottom wall 154 between an inner radius wall 156 and an outer radius wall 158. Other configurations are possible, but it is preferred that the termination of the upper wall be at a free and exposed edge having an outer surface configuration complementary to and substantially conforming to an adjacent surface in the housing.

The termination of the upper wall preferably has a lowest surface, such as the straight bottom wall 154, with adjacent walls extending to each side of the straight wall and extending upward away from the straight bottom wall 154. The outer wall 158 extends upward a greater distance than inner wall 156 before turning to the adjacent side wall surface 140 and the remainder of the left side wall 118. In this configuration, the termination of the left side wall is at a free edge that can extend into a groove having upwardly extending side walls on each side of a bottom surface. In the example shown in FIGS. 8 and 9, the profile in cross section of each of the side walls is substantially the same at any position along the longitudinal axis 122. In other configurations, the profile can change as the side wall approaches one or both of the end walls 126 and 128. Preferably, the wall extending from the bottom wall 154 over to the inside surface 140 is other than parallel to the support surface 130, but configurations where such wall is in fact parallel to the support surface 130 can be included in combination with a housing to accomplish one or more of the functions incorporated in the present configuration, for example limiting movement of the housing toward or away from the sidewalls or upward away from the base 108.

The edges of the receiver may include a defined radius, and the thickness of the respective walls may be substantially the same over the entire profile of the receiver, except, for example, at the transitions between the base and the side walls and at the termination edge 152. The material and the thicknesses may be selected to permit moderate flexing of the side walls for receiving the housing, as described more fully below. Preferably, the side walls limit movement of the housing toward or away from a respective side wall, and also limit upward movement of the housing relative to the respective side wall.

In the present examples, the receiver 102 is formed from a non-metal material. In the present examples, one material is TORLON, and other poly-amide imides as well as other structural plastics or polymers can be used, including but not limited to among others; Vespel or Aurum (PI), Ultem (PEI), Victrex or Ketaspire (PEEK), Primospire (SRP), Polycarbonate, or Epoxide or Phenolic synthetic resins. The material can also be a composite material and may include fiber reinforcement or other strengthening materials. In these examples, only the nut and the fasteners (such as rivets in openings 116 and their eyelets, if any) securing the receiver, if fasteners are used to secure the receiver, and possibly the bias element described below, are formed from a metal. Floating nut plates formed from non-metal materials with these or similar characteristics provide relatively high strength, and long lasting components that have relatively high resistance to corrosion. Additionally, molding of nut plates using such materials also permits manufacture of a number of nut plate configurations that can incorporate easily one or more of the features described herein. The nut plate components can be formed by a number of processes, including for example, compression molding, injection molding, machining, casting, stereolithography and others. Other materials may also include metal The nut element 104 in the present example is a conventional nut such as those used in other floating nut plate applications. The nut includes a bearing plate 160 (FIGS. 10-12) for resting on and being supported by the upper support surface 130 in the base 108. The nut bearing plate 160 includes long sides 162 and short sides 164, wherein the nut would be positioned in the receiver so that the long sides are parallel to adjacent side walls 118 and 120. The nut bearing plate 160 has substantially flat lower and upper surfaces, 166 and 168, respectively.

The nut element 104 includes a nut body 170 extending above the nut bearing plate 160. The nut body 170 is an internally threaded cylindrical portion that includes a base ring 172 immediately adjacent the bearing plate 160 and a reduced outside diameter neck portion 174 extending above the base ring 172. The base ring 172 includes a substantially vertical circumferential surface for contacting adjacent surfaces on the housing, described more fully below. The cylindrical portion can also have a constant outer diameter equal to that of the base ring 172, or have other shapes.

In the example shown in FIGS. 1-12, the nut element 104 includes a guide portion 176 extending downwardly from the bearing plate 160 in a direction opposite the body 170. The guide portion has a larger outside diameter than the body portion, and the guide portion helps to position the nut element in the opening 134. The guide portion also helps to keep the nut and receiver together when the guide portion extends into the opening 134, so that the combination does not become disassembled before final installation. The guide portion includes an internal counterbore 178, which extends to a frusto-conical portion 180 at the level of the lower surface 166, which in turn transitions to a bore 182. The counterbore helps to guide the fastener for threading into the nut element. The guide portion can also be omitted if desired.

The nut is formed from metal and is symmetric about both the transverse and longitudinal vertical planes. Consequently, the nut can be inserted into the receptacle in two orientations, one 180 degrees apart from the other. Other nut or fastener element configurations can be used, with or without changes in the floating nut plate configuration.

The floating nut plate assembly 100 (FIG. 1) includes a bias element in the form of a bi-lobe leaf spring 184 (FIGS. 1 and 13-14). The spring 184 includes a substantially square outer profile and a substantially square inner opening to form a pair of spaced apart leaf spring elements 186 coupled to each other by spaced apart connectors 188. The leaf spring elements 186 each have a substantially identical arcuate configuration and join the connectors 188 so that the connectors are substantially non-co-planar relative to each other, as can be seen in FIG. 14. The junctions 190 between the leaf spring elements and the connectors form an obtuse angle 192. When the leaf spring 184 is assembled with the floating nut plate assembly, with leaf spring outer edges 194 spaced apart from each other longitudinally, the junctions 190 rest on and bear against the support surface 130 of the receiver 102. The nut element 104 rests on and bears against each apex or mid-portion of the leaf springs. As that nut element bears against the leaf spring in the direction of the receiver base, the leaf spring biases the nut outward away from the base of the receiver. The leaf spring can be any conventional leaf spring used in floating nut plate assemblies, and may be formed from metal.

The floating nut plate assembly 100 also includes a nut element retainer, for example, a housing 200 (FIGS. 1-7 and 15-20). The housing 200 helps to keep the nut element 104 in position with the receiver 102. When a leaf spring is included, the housing 200 helps to keep the combination of the nut element and the leaf spring in position on the receiver 102. The housing 200 and the receiver 102 together define a minimum volume that the nut element 104 and leaf spring 184 occupy when the parts are assembled. The housing 200 also engages portions of the side walls in the receiver in such a way that housing 200 is substantially prevented from moving closer to or further away from either of the side walls once the parts are assembled. Additionally, the housing 200 engages portions of the side walls in the receiver in such a way that the housing 200 is substantially prevented from moving away from the base of the receiver in a direction substantially perpendicular to the base. In the example shown in FIGS. 1-5, once the parts are assembled, the housing 200 can move longitudinally substantially parallel to the longitudinal axis 122 (FIG. 4), as well as move closer to the base 108 of the receiver against the bias of the spring 184. The housing can move closer to the base of the receiver when the bolt 106 is tightened down, or when a load is applied to the bolt 106 axially upward when viewed in the orientation shown in FIG. 1. The housing 200 can move along the longitudinal axis 122 when the structures 112 and 114 (FIG. 1) move relative to each other in such a way as to cause the longitudinal movement.

The housing 200 includes a substantially planar body 202 extending in a plane substantially parallel to the base 108 if the housing is resting on the base. In the present example, the body 202 is substantially square in plan view (FIG. 17) and is sized to fit between the side walls 118 and 120 of the receiver while allowing the housing to move longitudinally. The body includes two pairs of legs, 204, 206, 208 and 210 extending downward from respective first and second end walls of the body. Each leg terminates in a respective foot portion, 204A, 206A, 208A, and 210A, each forming a substantially flat surface for making contact with the opposite bearing support surface 130 when the spring 184 is compressed. The flat surfaces against the flat bearing support surface 130 allows the housing to slide longitudinally. In the present example, the thickness of the planar body 202 and of parts of the legs are substantially the same, but vertical cross sections of the legs parallel to longitudinal axis 122 show that the legs taper toward the feet 204A, 206A, 208A, and 210A, decreasing the weight of the part.

The first end portion of the housing 200 has one pair of legs that includes the first and second legs 204 and 206. The legs extend inward from a left side wall 212 and a right side wall 214, respectively (FIG. 19), and stop spaced apart from each other at partially oppositely facing side walls 216 and 218. The facing sides of the legs form a gap 220 (FIG. 17) having a concave profile in plan view, and forming an inverted U-shape spacing extending between the adjacent legs. The gap 220 is sufficiently wide to allow the housing to move longitudinally over and beyond a fastener, such as a rivet or bolt head if used, in the opening 116. The gap, as well as a corresponding gap on the other side of the housing, allows a wider range of movement of the housing and nut element for a given size of receiver, or a smaller receiver for a given range of movement for the housing and nut element. Additionally, the concave profile of the gap provides clearance for the fastener on the outsides of the adjacent legs 204 and 206 while still keeping material on the insides of the legs for example, for reliably keeping the nut in place even while the nut is under torque.

The inside surfaces of the legs 204 and 206 extend substantially vertically downward from an underside surface 224 of the body 202. Consequently, the taper in the legs occurs through the outside surfaces of the legs. The legs 208 and 210 and a corresponding gap between them on the second end of the housing are substantial mirror images of the legs and gap 204, 206 and 220, with substantially the same structure and function.

The underside surface 224 and the substantially vertical inside surfaces of the legs form a substantially rectangular volume for receiving and limiting movement of the nut element to the volume. Specifically, the nut bearing plate 160 (FIGS. 6, and 10-12) is substantially rectangular in plan view and can move within the rectangular volume defined in part by the legs 204, 206, 208, and 210 and the underside surface 224 along with the side walls in the receiver and the support surface of the base 108. The underside surface 224 is preferably substantially flat to complement the substantially flat upper surface 168 of the nut bearing plate 160, allowing the nut element 104 to move relatively easily against the flat underside surface 224. Depending on the relative dimensions of the nut bearing plate 160 and the rectangular volume, the adjacent side walls can also be used to limit movement of the nut element.

The planar body 202 of housing 200 includes surfaces configured to complement the walls 154, 156 and 158 defining the exposed edge of the upper wall 136, as well as corresponding surfaces on the exposed edge of the upper wall 138. The surfaces may include grooves, channels, oppositely facing side walls or other surfaces complementary to corresponding surfaces on the receiver. In the example shown in FIGS. 1-20, the complementary surfaces are grooves formed by a plurality of longitudinally extending walls. Because the housing is substantially symmetrical about the longitudinal and transverse axes of the assembly, only one side of the housing will be described.

The planar body 202 of the housing 200 includes a plurality of surfaces configured to complement surfaces on the receiver. Specifically, the housing 200 includes an upper surface 226 (FIGS. 15-20) in the planar body 202 having a relatively straight, longitudinally extending flat surface. The portion of the upper surface 226 that is exposed is substantially flat and complements the substantially flat surface 154 (FIG. 9). The flat upper surface 226 forms part of a groove 228, which is also defined in part by an outer groove wall 230 and an inner groove wall 232, both formed so as to extend upwardly and away from the upper surface 226 to form the groove 228. The outer and inner groove walls are formed co-extensive with the longitudinal length of the surface 226 between the first and second ends of the housing. As shown in FIGS. 6-7, the profile of the groove 228 follows the outer profile of the exposed edge of the upper wall 136 of the receiver. In this configuration, the exposed edge of the upper wall 136 limits upward movement of the housing 200, and also limits transverse lateral movement of the housing relative to the side walls 118 and 120. Also in the example shown in FIG. 1-20, the contacting exposed edge and the groove substantially limit movement of the housing 200 to longitudinal movement along the receiver, for example parallel to the longitudinal axis 122, and downward movement, as viewed in FIGS. 6-7, toward the base 108 of the receiver. Other configurations of complementary surfaces between the upper wall 136 of the receiver and a portion of the housing 200 can also be used to limit vertical and/or transverse movement of housing relative to the receiver. They can also receive loading when the bolt is under torque or pushout loads.

The groove on top of the planar body 202 can be formed on the outside by an upwardly extending rounded wall 234 (FIG. 20), extending longitudinally of the planar body 202. The wall 234 preferably extends the entire length of the left side wall 212 and terminates adjacent the beginnings of the legs 204 and 208. As shown in FIGS. 6-7, the rounded wall 234 can be formed integral with the planar body 202.

The groove on top of the planar body 202 can also be formed on the inside by an outer platform wall 236 on a raised platform 238 on the planar body. As with the raised rounded wall 234, the outer platform wall 236 preferably extends the entire length of the left side wall 212 and terminates adjacent the beginnings of legs 204 and 208. As also shown in FIGS. 6-7, the platform 238 and the outer platform wall 236 can be formed integral with the planar body 202. Depending on the relative dimensions of the complementary surfaces, the outer groove wall 230 limits with wall 156 (FIG. 9) movement of the housing to the right as viewed in FIGS. 6-7, and the inner groove wall 232 limits with the wall 158 (FIG. 9) movement of the housing 200 to the left. Similar comments apply with respect to the groove and the upper wall 138 on the right side of the receiver. Other complementary surface configurations can also be used to achieve the same or similar results for limiting movement of the housing relative to the receiver.

As can be seen in FIGS. 6-7, the height of the platform 238 is approximately the same as the thickness of the planar body 202. The relative dimensions can be adjusted, but having the height of the platform 238 approximately the same as the thickness of the planar body provides additional strength to the housing. The platform extends transversely of the top of the housing from the groove 228 to the corresponding groove on the right side of the housing, and extends from the first end of the housing to the second end of the housing. The platform is substantially continuous except for an opening 240 defined by a substantially oval wall 242 extending completely through the planar body 202 and the platform 238, thereby providing an opening from the underside of the housing to the top of the platform. The opening 240 is configured to receive the body 170 of the nut element and is dimensioned so as to allow the nut to move transversely and slightly longitudinally relative to the housing, as a function of the outside diameter of the base ring 172 (FIGS. 10-12).

The housing can be made from the same material as the receiver. Alternatively, it can be made from a different material.

Figures 21A, 21B, 21C, 21D:
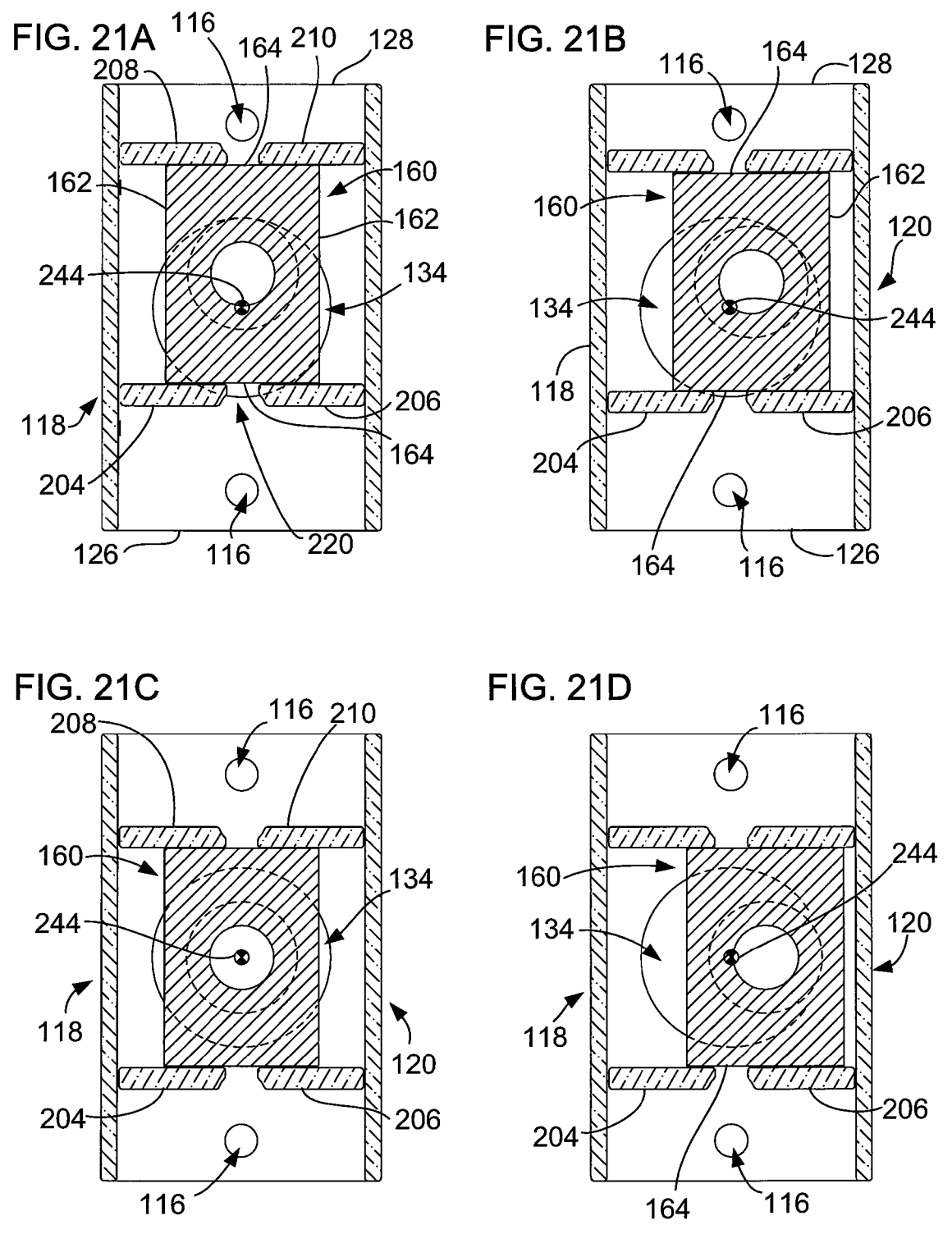

Movement of the nut element 104 and housing 200 are depicted through various positions after movement within the receiver 102 in FIGS. 21A-21D. FIG. 21A shows the housing and the nut element moved toward the second end 128 from the center 244. The housing is moved so that the legs 208 and 210 are relatively closer to the opening 116 at the second end 128, and the nut element is substantially centered between the side walls of the receiver. FIG. 21B shows the nut element moved toward the right side 120, and the contact between the guide portion 176 (FIG. 11-12) on the nut element and the wall 132 of the opening 134 moving the housing longitudinally toward the first end 126. FIG. 21D shows the nut element further to the right side 120 and the housing approximately centered relative to the center 244, with the guide portion 176 still in contact with the wall 132 of the opening 134. FIG. 21C shows the nut element and the housing substantially centered relative to the receiver. Similar views would occur with the nut element in other quadrants of the opening 134.

When loading is applied to the nut element relative to the receiver fixed to the underlying structural support, the grooves in the housing allow the housing to move longitudinally relative to the receiver. Additionally, the opening 240 in the housing allows the nut element to move transversely of the receiver when the nut element is under load.

In considering a method of assembly of the floating nut plate assembly in the example described with respect to FIGS. 1-20, the several parts are assembled by first placing the spring 184 into the receiver and against the support surface 130 with the sides 188 adjacent to the receiver inside surfaces 140 and 142. The spring 184 can be inserted longitudinally from the first or second ends of the receiver and under the upper walls 136 and 138 or by placing one side 188 against either inside surface 140 or 142 and junction 190 against the support surface 130, and flexing, pivoting, or bending the other side under the adjacent upper wall and then into contact with the support surface 130.

The nut element 104 is then placed over the spring 184 such that the nut element 104 is positioned with the ends 164 aligned parallel and approximately collinear with the spring sides 194, and the nut guide portion 176 oriented towards the receiver opening 134. One side, for example left side 212, of the housing 200 is angled and placed under the free edge 152 of the upper wall 136, and the housing is positioned over the nut element 104 and the spring 184. The housing is oriented so that it covers the nut element and the spring, with the housing gap 220 aligned with the fastener openings and so that the underside surface 224 will be coplanar with the upper support surface 168 of the nut element when assembly is complete. The other side, in this example right side 214 of the housing 200, is then placed against the upper wall 138 and pressed downward relative to the base 108. The right side wall 120 flexes outward allowing the housing to slide down into the receiver and underneath the free edge of the upper wall 138. The legs 204, 206, 208 and 210 of the housing extend outside of respective short sides 164 of the nut element and spring sides 189, while the spring 184 biases the nut element against the underside of the housing. The guide portion of the nut element extends through the opening 134, and the body 170 extends through the opening 240 in the housing. The free edges of the upper walls 136 and 138, respectively, engage corresponding grooves 228 in the housing, to allow longitudinal sliding of the housing relative to the receiver while substantially limiting transverse and upward movement of the housing relative to the receiver. Other methods of assembly may be used.

In an alternative assembly, the spring element can be inverted and placed over the nut element after the nut element is placed in the receiver and before the housing is placed in the receiver. This configuration allows the spring to help maintain axial alignment of the nut element while the bolt 106 is threaded into the nut element. An example of this type of configuration is reflected in FIG. 26A, described more fully below. The spring element can also be omitted. Other alternative methods of assembly may be used.

In another configuration of a floating nut plate assembly, similar components are given the same reference numeral with an "A" at the end. In the example shown in FIGS. 22-24, the receiver 102A in part of a floating nut plate assembly 100A has the housing 200A tethered or at least temporarily tied to the receiver. The configuration of the receiver 102A is substantially identical to the receiver 102, and the housing 200A is substantially identical to the housing 200. In the present example, the two components are tethered together with at least one and, as shown in FIGS. 22-24, two tethers 250. One end of each tether 250 is fixed, such as by simultaneous molding, to one of the upper wall portions, such as upper wall portion 136, equidistant from a longitudinal center along the upper wall portion. The other ends are fixed to, such as by simultaneous molding with, the platform 238 sufficiently far from the groove 228 to allow easy engagement between the groove and the free end of the upper wall portion 136. The tethers are preferably formed with a material and with dimensions so as to allow the tethers to be flexible enough to easily permit assembly of the components, such as previously described with a spring and nut element. The tethers can be configured as living hinges, for example to permit the full extent of float in either direction expected during operation and that permit disassembly and reassembly, or the tethers can be cut or broken off once an assembly is complete. The methods of assembly are otherwise substantially the same as described herein.

The tethers can take a number of configurations, and may include discrete connections or a continuous web. The connection can be a single connection or multiple connections, and the connections can be placed at a number of locations, as desired.

In another configuration of a floating nut plate assembly, similar components are given the same reference numeral with a "B" at the end. In the example shown in FIGS. 25-27, the nut element 104, the spring element 184 and the housing 200B are the same or substantially the same as those described previously, and a single tether 250B is used instead of multiple tethers. The methods of assembly are otherwise substantially the same as described herein.

Figure 25:
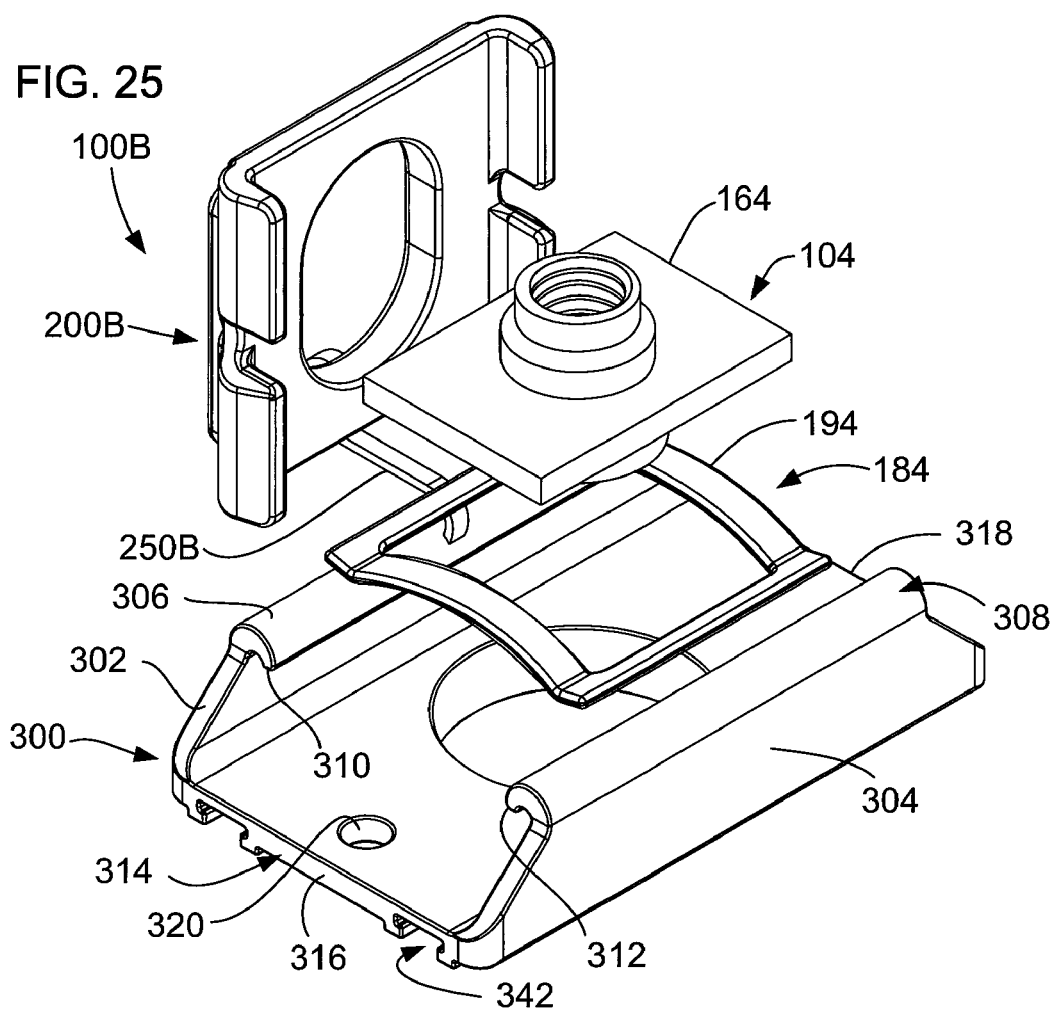
FIG. 25 is an isometric and exploded view of another example of a floating nut plate assembly.
Figure 26:
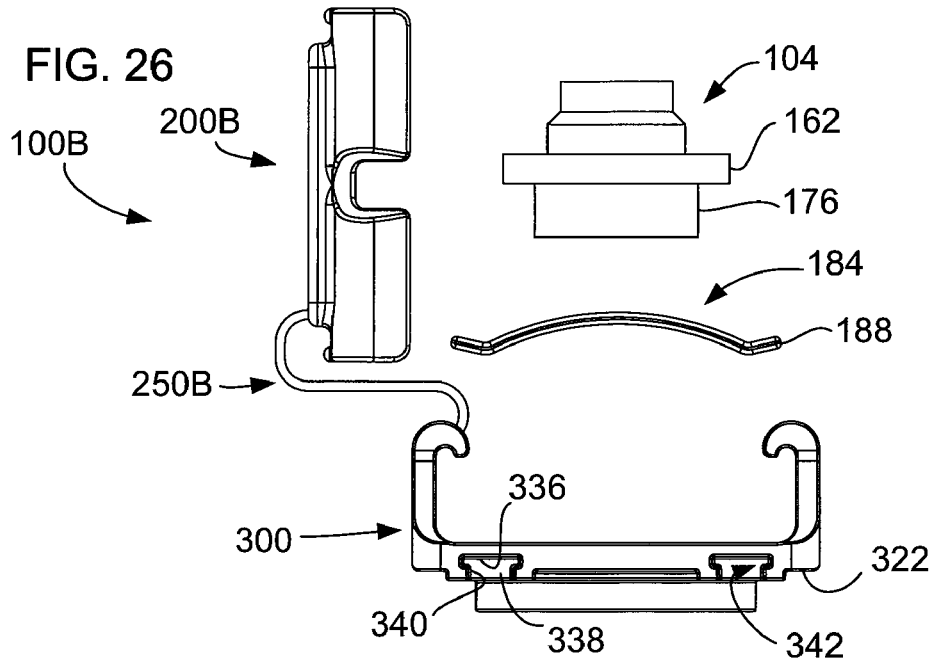
FIG. 26 is an end elevation view of the floating nut plate assembly of FIG. 25.

In the example shown in FIGS. 25-27, a receiver 300 includes left and right side walls 302 and 304 having upper wall portions 306 and 308, respectively, with free ends 310 and 312 for engaging the grooves in the housing. The structure and functions of the side walls and the free ends are substantially the same as those described above with respect to the other receivers. The upper wall portions 306 and 308 extend longitudinally a distance less than the longitudinal length of the base 314. The side walls 302 and 304 angle downward and outward to join the first end 316 and the second end 318 of the base 314. This side wall configuration can be used with any of the other receivers described herein, and any of the other receivers can be used with the configuration described with respect to FIGS. 25-27.

Additionally, the base and any of the other elements of the receiver 300 described with respect to FIGS. 25-27 can be used with any of the other components described herein, for example by substituting the receiver in place of the other receiver described. In the receiver 300, the receiver includes one or more openings 320 for receiving a fastener, adhesive or other material to help in fixing the receiver and therefore the floating nut plate assembly to the underlying support structure. Any of the means for fixing described herein can be used to help in fixing the receiver to the underlying support structure.

The base 314 and its support surface 322 also includes one or more of a plurality of projections from the flat underside support surface 322. The projections may take a number of configurations. They can have geometric shapes, simple or complex shapes, and they may extend the same distance from the surface 322 or different distances. The projections may include cylindrical buttons or bosses, linear-extending ribs 324, arcuate ribs 326, posts such as post 328 and ring walls 330, which may be a solid wall or a broken wall. The projections shown in the present example extend the same distance away from the surface 322 except for the post 328 and the ring wall 330. The projections may help to position the combination on an underlying support structure, and the may also help to secure the combination in place. For example, the ring wall 330 may extend into a corresponding opening in the underlying support structure to help register the combination relative to be corresponding opening. As well, the ring wall may be solid or broken, such as crenellated, or made up of other shapes that would be consistent with registering the receiver with the underlying support structure 112, but without impinging on the nut element float needed for the application. The post 328 may also extend into a corresponding opening in the underlying support structure to help register the combination. Additionally, adhesive may be used between the flat underside support surface 322 and the underlying support structure to help hold the combination in place. The projections may help with the adhesive to more securely hold the combination placed on the underlying support structure. One or more of the individual projections can be omitted or other or additional projection configurations can be used to either or both help position and/or hold the combination in place. Additionally, where adhesive is used and openings such as fastener opening 320 is provided, adhesive extending into or through the opening may further help to hold the combination in place. The support surface 322 in another alternative can be a smoothed surface, or can have a textured or a multi-faceted surface.

Various structures may be used to help hold the combination in place, including those described above. In the combination shown in FIGS. 25-27, plural openings 320 can be included, or they can be omitted. For example, an additional opening can be provided where the post 328 is positioned, in a manner similar to the securing portions described with respect to other examples. Eyelets can also be included. For example, a post 328 can be used in place of the opening 320. Also, one or more of the projections from the support surface 322 can be omitted or changed from the configurations shown in the example, as desired.

In addition to bosses, such as bosses 324, or in place thereof, cavities can be formed in the base 314. In one example, cavities 332 may be formed in the base 314. A single cavity can be formed, or as shown in FIGS. 25-27, multiple cavities can be formed. The cavity can include an open side 334 for allowing adhesive or other flowing bonding material to enter the cavity, or to allow adhesive or other material entering from below to exit the cavity. The cavity 332 includes a cavity wall 336, an end wall 338 and side walls 340. The end wall 338 and side walls 340 can be defined in part by bosses 324. Material can flow into the opening defined by the bosses 324 from below or through the side opening 334. The material can set to help fix the receiver on the structural support.

The cavity 332 can include more than simple straight, flat side surfaces to which the material can bond or adhere. In the example shown in FIGS. 25-27, recesses or convoluted surfaces such as insets 342 can be used to capture and retain material. When the material sets, the material is keyed into the insets, further securing the receiver to the underlying support structure. Other structures can be used to help capture and retain material, to more securely hold the receiver on the underlying support structure.

In an alternative configuration (FIG. 26A), the nut element 104, the spring element 184 and the housing 200B are the same or substantially the same as those described previously, except that the spring element is inverted and placed over the nut element after the nut element is placed in the receiver and before the housing is placed in the receiver. This configuration allows the spring to help maintain axial alignment of the nut element while the bolt 106 is threaded into the nut element.

In another configuration of the receiver, the receiver can include one or more structures other than the nut opening for limiting longitudinal movement in the receiver of the nut and housing. A receiver 400 (FIGS. 28, 29, 30 and 31) can limit longitudinal movement of the nut and housing through means other than the edge of opening in the base of the receiver for the nut. Therefore, the receiver 400 can be used with a nut regardless of whether the nut includes a complete guide portion (as described for 176 in FIGS. 10-12). Additionally, the receiver 400 can be used with any of the nut, spring and/or housing configurations described herein. Furthermore, the receiver can be configured to be mounted, bonded or otherwise fixed to the underlying support structure through any of the means described herein. The receiver can also be formed from any of the materials described herein, as well as others that would be considered by one skilled in the art.

The receiver 400 limits longitudinal movement of a housing and a nut, and the receiver also includes structures such as the termination structures described above with respect to edge 152 that limit also upward/outward as well as sideways movement of a housing, and therefore a nut. However, it should be understood that the receiver 400 can be configured to limit longitudinal movement of a housing and the nut without using the termination structures such as edge 152 in the other receiver configurations described herein, relying instead on contact between a nut guide portion and nut opening in the base of the receiver or receiver side walls or other structures. Conversely, incorporating structures for limiting longitudinal movement of the housing and nut as well as termination edge structures such as those described herein in a receiver benefits from being able to use a number of nut configurations and housing configurations. Therefore, the description herein of the receiver 400 will be made according to a configuration that incorporates the previously described structures as well as further structures other than the nut opening for limiting longitudinal movement of a housing and nut.

The receiver 400 has structures and is formed substantially identical to the receivers described herein and are numbered with identical reference numerals except as described herein. Specifically, at least one of the left and right side walls 118 and 120 include at least one, and preferably at least a pair in one side wall, and more preferably a pair in each side wall, of separations 402 breaking a respective side wall into sections. Separations 402 may be cuts, openings or other discontinuities forming a side wall into one or more sections. In the configuration shown in FIGS. 28 and 29, the separations 402 are formed in the side walls outboard or longitudinally beyond a radius of the opening 134 for the nut guide portion. The separations 402 are in board of the end walls 126 and 128, and in board of the openings 116 in the base 108. The separations 402 are formed completely through the side walls and upper walls as well as the termination edges, and extend toward the base 108 approximately to the start of the radius between the respective side wall and the base 108. The separations 402 are formed sufficiently to provide the desired flex in the side walls for insertion of the housing. The separations can be formed to a depth less than the radius to the base 108, and they can be formed to a point less than completely through the termination edge. The separations 402 separate the left side wall into first and second end portions 404 and 406, respectively, and intermediate left side wall portion 408. The separations 402 separate the right side wall into first and second end portions 410 and 412, respectively, and intermediate right side wall portion 414.

The separations 402 in each pair in a side wall are spaced sufficiently from each other to permit the desired flexing upon insertion of the housing, such as using the methods described herein. In one configuration, the spacing between separations in a given pair is at least the longitudinal length of the housing to be used with the receiver. In the present example, a separation is formed in both side walls so that orientation of the receiver is not relevant during assembly. As can be seen in FIG. 29, the receiver is symmetric about the medial longitudinal and transverse axes.

The fastener openings 116, when included, are configured substantially identical to those described herein. The nut opening 134 is also substantially identical, but where a nut is used without a guide portion 176, the opening diameter can be smaller.

The receiver 400 includes structures for limiting longitudinal movement in the receiver of a housing. In the example shown in FIGS. 28, 29, 30 and 31, the receiver 400 includes end bars 416 and 418. The end bar 416 limits longitudinal movement of the housing, and therefore of the nut, toward the first end 126 of the receiver. The end bar 418 limits longitudinal movement of the housing, and therefore of the nut, toward the second end 128 of the receiver. In the present configuration of the receiver 400, the first end bar 416 extends between the first end portions 404 and 410 from the respective edge surfaces and substantially parallel to the base 108. The end bar 418 extends between the second end portions 406 and 412 from the respective edge surfaces and substantially parallel to the base 108. Each of the end bars are positioned below the top surfaces of the upper walls 136 and 138 and include inside edges 420 and 422 that corresponding adjacent edges of the platform of a housing come into contact with when the housing approaches the respective end bar. Each end bar has a rectangular cross-section except for openings 424, which openings are for receiving tools or fasteners during installation. Each end bar joins a respective side edge through an upwardly turning radius 426 or an inwardly turning radius 428 (FIGS. 28 and 29). When contacted by an adjacent surface on a housing, an end bar also resists torque loading from housing.

As shown in FIG. 30, the upper wall portions 136 and 138 have no termination portions at the corresponding end bars, and instead merge with the respective end bars 416 and 418. Consequently, the upper wall portions 136 and 138 extend downward and inward to the end bars and to a lower surface 430 extending substantially parallel to the upper base surface 130.

As shown in FIG. 31, the upper wall portions 136 and 138 at the intermediate wall portions 408 and 414 terminate in relatively flat, abbreviated end edges 152A having substantially flat lower surfaces for engaging upwardly facing grooves or other surfaces in a housing. The end edges 152A serve substantially the same functions as the corresponding end edges 152 described herein.

In another example of a receiver otherwise substantially identical to the receiver 400, a receiver 440 (FIG. 30A)

includes end walls in the form of struts 442 and 444, each extending inward and downward from respective upper walls to join the base 108. Each strut joins the base on its respective side of the fastener opening 116. The longitudinal length of each strut can be substantially the same as the longitudinal length of the end bar in the example of FIG. 28.

In another configuration of a receiver, having one or more structures other than a nut opening for limiting longitudinal movement of the nut and housing, a receiver 500 (FIGS. 32-34) can be used with a housing for limiting longitudinal movement in the receiver of the housing and therefore the nut. As a result, the receiver 500 can be used with a nut regardless of whether or not the nut includes a guide portion (176 in FIGS. 10-12). The receiver 500 can be used with any of the nut and spring configurations described herein. The receiver can also be formed from any of the materials described herein, as well as others that would be considered by one skilled in the art.

The receiver 500 limits longitudinal movement of a housing and a nut, and the receiver also includes structures such as the termination structures described above with respect to edge 152 that limit also upper/outward as well as sideways movement of a housing, and therefore a nut. However, it should be understood that the receiver 500 can be configured to limit longitudinal movement of a housing and a nut without using the termination structures such as edge 152 in the other receiver configurations described herein, relying instead on contact between a nut guide portion and nut opening in the base of the receiver or receiver side walls or other structures. Conversely, incorporating structures for limiting longitudinal movement of the housing and nut as well as termination edge structures such as those described herein in a receiver benefits from being able to use a number of nut configurations. Therefore, the description herein of the receiver 500 will be made according to a configuration that incorporates the previously described structures as well as further structures other than the nut opening for limiting longitudinal movement of a housing and nut.

The receiver 500 includes a stop or limit element 502 extending substantially downward toward the upper surface 130 of the base 108 from a corresponding end edge 152. Each of the left and right sides includes a corresponding stop element 502. In other configurations, a single stop element can be used. The stop element contacts and/or extends into a complementary surface in a housing (FIGS. 35-39) for limiting movement of the housing in the longitudinal direction. Therefore, the stop surface also limits longitudinal movement of the nut within the housing. In the configuration shown in FIG. 32, the stop element 502 is positioned midway between the first and second ends of the respective termination edge. The length of the stop element in the longitudinal direction may be selected so as to permit the corresponding housing to float the desired longitudinal distance, and in the example shown in FIGS. 32-34, the length of the stop element is a small percentage of the overall length of the receiver. The width of the stop element in the present example is substantially the same as the width of the end portion of the corresponding upper wall. The depth of the stop element from the terminal edge 152 to the free, flat end surface 504 is selected so as to reliably fit into the corresponding structure in the housing (described more fully below). The stop element includes substantially vertical side surfaces curving toward each other to the flat surface 504 through radiused corners. In other configurations, the stop element can extend in other directions so as to cooperate with corresponding structures in the housing for limiting longitudinal movement of housing, as well as possibly limiting sideways movement and/or upward movement of the housing relative to the receiver.

Figure 32:
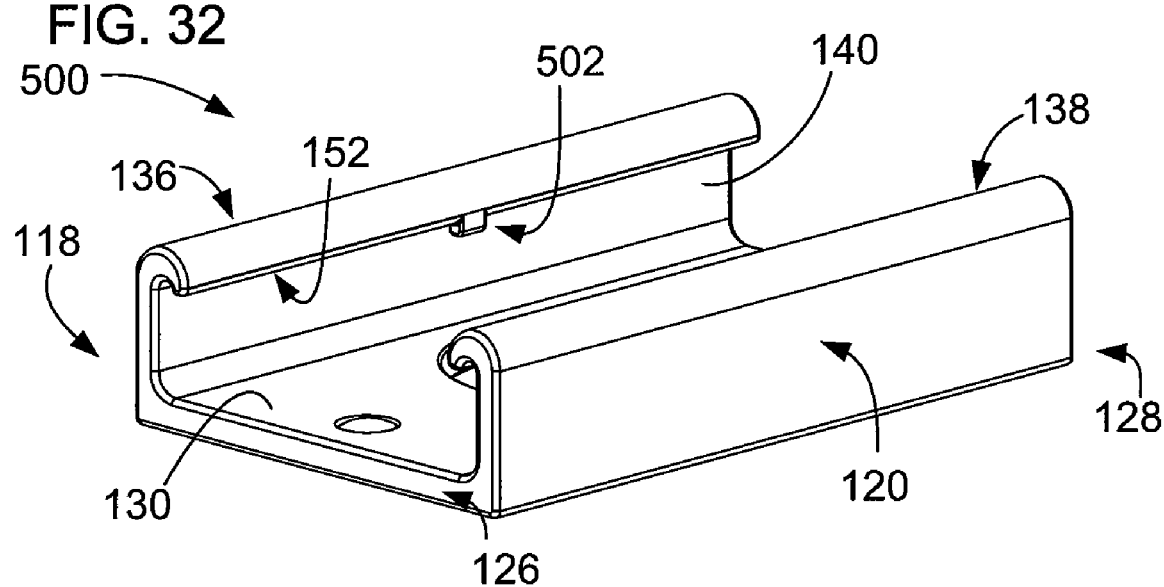
FIG. 32 is an upper right isometric view of an alternative receiver for use in a nut plate assembly in accordance with another example.
Figure 33:
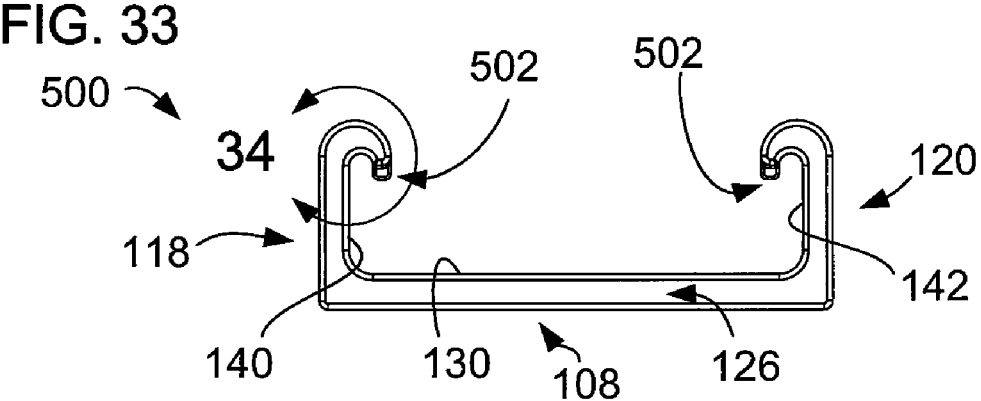
FIG. 33 is an end elevation view of the receiver of FIG. 32.
Figure 34:
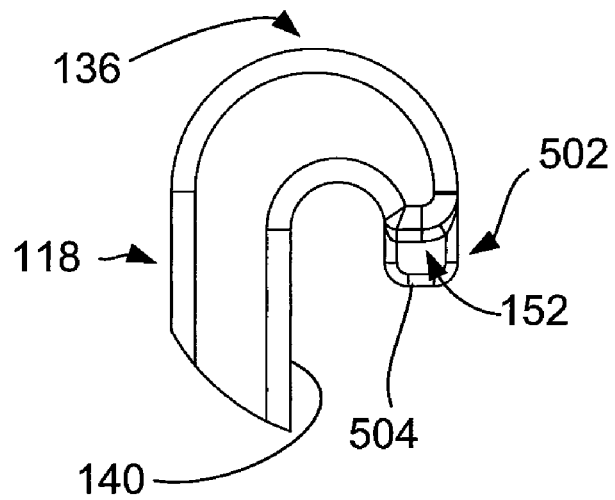
FIG. 34 is a detailed view of a portion of the receiver of FIG. 32 taken at 34 of FIG. 33.

In other configurations of a receiver such as that shown in FIGS. 32-34, stop elements can be positioned to extend downward from the corresponding terminal edge portions at first and/or second ends of the edge portions. For example, a stop element can extend downward from the corresponding terminal edge portion at the first end 126 of the upper wall portion 136 and/or at the second end 128 of the upper wall portion 136. Likewise, a stop element can extend downward from the corresponding terminal edge portion at the first end 126 of the upper wall portion 138 and/or at the second end 128 of the upper wall portion 138. Similarly, a stop element can extend downward from the terminal edge portion at the first end 126 of the upper wall portion 136 and a second stop element can extend downward from the terminal edge portion at the second end 128 of the upper wall portion 138. These stop portions would be contacted by corresponding end surfaces of the housing, such as in the housing 200 described herein. The configurations of these stop elements can be identical or substantially similar to those corresponding to stop element 502. The stop portions can be positioned at other locations as well.

In another example of a housing substantially identical in structure, function, material and result to the housing 200 other than as described herein below, a housing 600 (FIGS. 35-39) includes abbreviated grooves 602 and 604 formed by respective spaced apart pairs of abbreviated ridges 606 and 608, and 610 and 612, respectively. The ridges in each pair of ridges are separated or spaced apart from each other by respective cavities or cut outs 614 and 616 formed into the base of the housing. Each cut out has substantially vertical end walls 618, substantially vertical side walls 620 and substantially horizontal, flat bottom walls 622. The width of the cut outs, and therefore of the walls 618, is selected so as to permit longitudinal movement of the housing relative to the stop elements 502 in the receiver 500. The lengths of the stop elements 502 and of the cut outs 614 and 616 (and therefore the lengths of the walls 620 and 622) are selected together so as to permit the desired longitudinal movement of the housing, and therefore of the nut in the receiver.

The methods of assembly and use of the receivers, springs, nut elements and housings of the configurations shown in and/or described with respect to FIGS. 28-39 are substantially the same as those described herein for the other configurations of components. They may be used with nut elements having guide portions 176 as described herein, or the guide portions 176 may be minimized or excluded entirely.

Having thus described several exemplary implementations, it will be apparent that various alterations and modifications can be made without departing from the concepts discussed herein. Such alterations and modifications, though not expressly described above, are nonetheless intended and implied to be within the spirit and scope of the inventions. Accordingly, the foregoing description is intended to be illustrative only.

What is claimed is:

1. A floating nut plate comprising:
   a receiver having a substantially planar support portion for supporting a fastener assembly, the receiver including upwardly-extending and oppositely-facing side walls terminating in downwardly-facing edges;
   a nut element having a support portion positioned between the receiver support portion and the downwardly-facing edges; and
   a nut element retainer having at least partly upwardly-facing contact walls for contacting the downwardly-facing edges, wherein the upwardly-facing contact walls are non-flat in transverse cross section and extend substantially straight in a first direction longitudinally of the receiver, and wherein the retainer further includes first and second walls each extending downward along respective sides of the nut element retainer at an angle to the first direction and on opposite sides of the nut element.

2. The nut plate of claim 1 wherein the receiver includes a wall defining a receiver opening, wherein the nut element retainer includes a wall defining a retainer opening and wherein the nut element includes a body portion extending in the retainer opening and a guide portion extending into the receiver opening.

3. The nut plate of claim 2 wherein the nut element includes a substantially rectangular plate smaller than a distance between the oppositely-facing side walls of the receiver.

4. The nut plate of claim 2 wherein the retainer opening is substantially larger than the nut element body portion and wherein the receiver opening is substantially larger than the nut element guide portion.

5. The nut plate of claim 1 wherein the retainer first and second walls each include converging end portions.

6. The nut plate of claim 1 wherein each of the retainer first and second walls include respective walls defining respective openings from one side of the wall to another side of the wall.

7. The nut plate of claim 1 wherein the nut element retainer includes a raised portion extending between the contact walls to a level higher than the downwardly-facing edges when the nut element retainer is in contact with the downwardly-facing edges.

8. The nut plate of claim 7 further including a wall defining an opening through the raised portion.

9. The nut plate of claim 8 wherein the opening is substantially oval.

10. The nut plate of claim 1 wherein the nut element retainer is non-metal.

11. The nut plate of claim 10 wherein the receiver is non-metal.

12. The nut plate of claim 1 wherein the receiver is non-metal.

13. The nut plate of claim 1 wherein the retainer includes a side extending between the first and second walls of the retainer and wherein the side is substantially straight.

14. The nut plate of claim 1 wherein the upwardly-facing contact walls include longitudinally extending grooves.

15. The nut plate of claim 14 wherein the grooves extend substantially completely between the first and second walls of the retainer.

16. The nut plate of claim 1 wherein the receiver downwardly facing edges extend in a direction substantially perpendicular to the planar support portion.

17. The nut plate of claim 1 wherein the planar support portion forms a substantially rectangular surface.

18. The nut plate of claim 1 wherein the planar support portion extends between longitudinally opposite end surfaces and wherein the side walls extend substantially the entire distance between the end surfaces.

19. The nut plate of claim 1 wherein the planar support portion extends between longitudinally spaced apart end surfaces and wherein a side wall extends less than the entire distance between the end surfaces.

20. The nut plate of claim 1 wherein the nut element retainer further includes a third wall extending toward the planar support portion of the receiver and a wall defining an opening through the third wall.

21. The nut plate of claim 1 wherein at least one of the receiver and the nut element retainer is formed from a structural plastic or a structural polymer or a polyamide imide or a composite material.

22. The nut plate of claim 1 further including a bias element positioned between the planar support portion and the nut element retainer.

23. The nut plate of claim 1 wherein at least one of the upwardly-facing contact walls includes a flat upper surface and a wall of a raised portion.

24. The nut plate of claim 23 wherein the wall of the raised portion forms part of a platform extending between the upwardly-facing contact walls.

25. The nut plate of claim 23 wherein the wall of the raised portion extends a length of the nut element retainer.

26. The nut plate of claim 1 wherein a material of at least one of the receiver and the nut element retainer includes a metal.

27. A floating nut plate assembly comprising:
a nut plate receiver having a base portion and first and second side walls extending upward from the base portion and then curving downward to respective end portions facing the base portion;
a nut element having a support portion that is positioned in an area between the receiver base portion and the end portions of the first and second receiver side walls; and
a nut element retainer having first and second walls extending on separate sides of the nut element, upwardly-facing grooves engaging respective ones of the first and second side wall end portions, and wherein the retainer includes a platform extending between the upwardly-facing grooves to an upper surface above bottoms of the respective grooves, wherein at least one groove has a wall on a side of the groove opposite the platform extending upward to a first height below the upper surface of the platform, and wherein the retainer further includes a wall defining an opening and wherein a portion of the nut element extends into the opening.

28. The assembly of claim 27 wherein the nut element retainer further includes a third wall extending toward the nut plate receiver base portion and a fourth wall defining an opening through the third wall.

29. The assembly of claim 27 wherein the nut element retainer further includes at least a third wall extending in a direction away from the upwardly-facing grooves and wherein the third wall includes a concave surface formed in the wall.

30. A method of assembling a floating nut plate assembly comprising:
placing a nut element in a receiver having a base with a base surface and at least one side wall extending to an edge such that the nut element is supported by the base surface and wherein the nut element includes engagement portions and is configured and positioned in such a way that when a complementary fastener element engages the engagement portions of the nut element, the nut element is drawn toward the base of the receiver;
positioning a housing element having a groove such that the nut element is between the base and the housing element, and placing a portion of the housing element under the edge of the wall on the base such that the edge and the groove come into contact in an area between the edge and the base surface of the receiver.

31. The method of claim 30 further including placing a second portion of the housing element under a second wall on the base such that a second edge and a second groove come into contact between the second wall and the second portion of the housing.

32. The method of claim 30 further including positioning a guide portion of the nut element in an opening in the base.

33. The method of claim 30 further including positioning a portion of a nut body of the nut element in an opening in the housing element.

34. The method of claim 30 further including positioning a resilient element between the nut element and the base of the receiver.

35. The method of claim 30 further including moving the housing element so that the groove extends under the edge of the wall.

36. The method of claim 30 further including moving the nut element toward the base followed by moving the housing element so that the groove extends under the edge of the sidewall.

37. The method of claim 36 wherein the sidewall is a first sidewall and further including moving the housing element against a second sidewall of the receiver.

38. The method of claim 37 further including flexing the second sidewall outward relative to the first sidewall.

39. The method of claim 36 further including placing a second groove of the housing element under an edge of the second sidewall.

40. The method of claim 36 further including moving a spring element against the base of the receiver.

41. A floating nut plate assembly comprising:
a receiver having a substantially planar support portion for supporting a fastener assembly, the receiver including first and second upwardly-extending and oppositely-facing side walls terminating in first and second downwardly-facing edges;
a nut element having a support portion positioned between the receiver planar support portion and the downwardly-facing edges; and
a nut element retainer having a longitudinally and transversely extending nut retainer portion, wherein the longitudinally and transversely extending nut retainer portion has an underside surface at a first distance from a plane of the planar support portion when the retainer contacts the first and second downwardly-facing edges of the receiver and has an upper-most surface a second distance from the plane when the retainer contacts the first and second downwardly-facing edges of the receiver greater than the first distance, wherein the nut element retainer includes first and second contact portions for contacting respective ones of the first and second downwardly-facing edges, wherein the first and second contact portions are each a third distance from the plane when the retainer contacts the first and second downwardly-facing edges of the receiver, and wherein the third distance is greater than the first distance and less than the second distance, and wherein the nut element retainer includes first and second side walls each extending downward along respective sides of the nut element retainer at an angle to the first direction and on opposite sides of the nut element.

42. The assembly of claim 41 wherein the upper-most surface of the retainer defines a raised platform extending between the first and second contact portions.

43. The assembly of claim 41 wherein the upper-most surface of the retainer defines an opening for a portion of the nut element.

44. The assembly of claim 43 wherein a thickness of the opening is greater than a thickness of the longitudinally and transversely extending nut retainer portion at the first and second contact portions.

45. The assembly of claim 41 wherein the first and second contact portions are formed by grooves.

46. The assembly of claim 41 wherein the first and second downwardly-facing edges face in a direction perpendicular to the plane of the planar support portion.

47. The assembly of claim 41 further including a bias element positioned between the planar support portion and the nut element retainer.

48. The assembly of claim 41 wherein at least one of the retainer and the receiver are non-metal.

\* \* \* \* \*